(12) United States Patent
Mao et al.

(10) Patent No.: US 10,541,635 B2
(45) Date of Patent: Jan. 21, 2020

(54) MOTOR SYSTEM AND CONTROL METHOD

(71) Applicant: Quanten Technologies, Inc., Allen, TX (US)

(72) Inventors: Hengchun Mao, Allen, TX (US); Xuezhong Jia, Allen, TX (US)

(73) Assignee: Quanten Technologies, Inc., Allen, TX (US)

( * ) Notice: Subject to any disclaimer, the term of this patent is extended or adjusted under 35 U.S.C. 154(b) by 0 days.

(21) Appl. No.: 16/115,862

(22) Filed: Aug. 29, 2018

(65) Prior Publication Data

US 2019/0068103 A1 Feb. 28, 2019

Related U.S. Application Data

(60) Provisional application No. 62/552,012, filed on Aug. 30, 2017.

(51) Int. Cl.
| | |
|---|---|
| *H02P 25/18* | (2006.01) |
| *H02P 25/20* | (2006.01) |
| *H02P 29/028* | (2016.01) |
| *H02P 25/22* | (2006.01) |
| *H02K 1/00* | (2006.01) |
| *H02K 3/28* | (2006.01) |
| *H02K 17/14* | (2006.01) |

(52) U.S. Cl.
CPC ............ *H02P 25/20* (2013.01); *H02K 1/00* (2013.01); *H02K 3/28* (2013.01); *H02K 17/14* (2013.01); *H02P 25/22* (2013.01); *H02P 29/028* (2013.01); *H02K 2213/12* (2013.01)

(58) Field of Classification Search
USPC .................................................. 318/494–499
See application file for complete search history.

(56) References Cited

U.S. PATENT DOCUMENTS

| | | | |
|---|---|---|---|
| 4,035,701 A | 7/1977 | Jensen | |
| 4,670,696 A * | 6/1987 | Byrne | H02K 19/103 310/168 |
| 6,025,693 A | 2/2000 | Smith | |
| 6,456,033 B1 | 9/2002 | Nishimura | |
| 2004/0189242 A1 | 9/2004 | Pyntikov et al. | |
| 2006/0290324 A1 | 12/2006 | Jabaji | |
| 2007/0138985 A1 | 6/2007 | Ley et al. | |
| 2009/0224627 A1 | 9/2009 | Hino et al. | |
| 2012/0187922 A1 | 7/2012 | Dubois et al. | |
| 2015/0002068 A1 | 1/2015 | Durham et al. | |
| 2016/0301348 A1 | 10/2016 | Mao et al. | |
| 2017/0012562 A1 | 1/2017 | Durham et al. | |
| 2018/0034401 A1 * | 2/2018 | Mao | H02P 25/20 |

\* cited by examiner

*Primary Examiner* — Bentsu Ro

(74) *Attorney, Agent, or Firm* — Slater Matsil, LLP

(57) ABSTRACT

A motor control method comprises detecting operating parameters of a motor system comprising a plurality of windings, a rotor, a stator magnetically coupled to the rotor and a plurality of power converters connected to the plurality of windings, determining, by a controller, a suitable pole number and a preliminary set of operating variables based upon the operating parameters, reducing operating stresses of the motor system gradually and after reducing the operating stresses, configuring the plurality of power converters so as to adjust the number of poles of the motor system according to the suitable pole number.

20 Claims, 27 Drawing Sheets

MOTOR SYSTEM AND CONTROL METHOD

This application claims the benefit of U.S. Provisional Application No. 62/552,012, filed on Aug. 30, 2017, entitled "Power Converter and Control Techniques for Dynamically Reconfigurable Motor and Generator Systems," which application is hereby incorporated herein by reference.

TECHNICAL FIELD

The present disclosure relates to a motor and/or generator system, and, in particular embodiments, to innovative technologies which improve the design, construction and control of advanced motors/generators and drive systems.

BACKGROUND

An electric machine (motor or generator) is an apparatus converting energy between electric power and mechanical rotary motion. There are different types of electric machines including induction machines, permanent magnets machines, switching reluctance machines, synchronous reluctance machines and hybrid machines. The various embodiments in this disclosure are applicable to the different types of electric machines above, which are configured as either motors or generators. Induction motors as an example are used to illustrate the innovative aspects of the present disclosure. The induction motor comprises a stator and a rotor. The stator is the stationary part and the rotor is the rotating part. The rotor may be inside the stator, outside the stator or beside the stator as in an axial field machine. An induction motor having a rotor inside a stator is used as an example to illustrate the innovative aspects of the present disclosure. A small motor air gap exists between the rotor and the stator for mechanical clearance and mechanical torque generation.

The squirrel cage inductor motor is the most common electric machine. The stator of the squirrel cage inductor motor comprises a plurality of windings. The plurality of windings usually forms a plurality of phase belt arranged in pole pairs. The rotor of the squirrel cage induction motor comprises a shaft and a squirrel cage made of metal bars contained in a magnetic structure such as a laminated silicon steel stack. The shaft is surrounded by the metal bars. First ends of the metal bars are connected by a first interconnect ring. Second ends of the metal bars are connected by a second interconnect ring.

In operation, the electric power is usually applied to the stator. As a result, a first magnetic field is created in the stator and in the air gap. The first magnetic field rotates in time at a synchronous speed with alternating current (ac) power applied to the stator windings. The first magnetic field induces electric currents in the metal bars of the rotor. The induced current produces a second magnetic field in the rotor. The second magnetic field of the rotor reacts against the first magnetic field of the stator. According to Lenz's Law, the rotor follows the rotating first magnetic field and generates a mechanical torque pulling the rotor into rotation. In a motor mode, the rotor will fall behind the first magnetic field. The speed difference between the first magnetic field and the rotor keeps inducing the electric current inside the rotor. If a load is applied to the rotor and the rotor falls further behind the first magnetic field, more torque will be developed due to the lag between the rotor and the first magnetic field. In other words, the torque of the motor is approximately proportional to the slip between the speed of the rotor and the speed of the first magnetic field.

The theoretical speed of the rotor in an induction motor traditionally depends on the frequency of the electric power supply and the arrangement of poles in the stator coils. With no load on the motor, the speed of the rotor is equal to or approximately equal to the synchronous speed of the rotating magnetic field. The synchronous speed of an inductor motor is determined by the frequency of the electric power supply and the number of poles of the inductor motor. In particular, the speed of the induction motor is equal to the frequency of the electric power supply times 60 and further divided by the number of pole pairs.

As energy efficiency becomes an increasingly important issue, more motors and generators are coupled to power electronics equipment in variable speed applications, such as industrial drives, electrical vehicles, diesel-generator sets, servo systems, and wind power generation. Many of these applications require the motors and generators to operate over a wide speed and power range, and traditional technologies cannot satisfy the performance and cost requirements for such applications. Especially, as renewable energy becomes an important issue, more motors are used to drive electrical vehicles. There may be a need for having a motor operating efficiently over a wide speed and power range. Traditional motors cannot satisfy the performance and cost requirements for such applications. It has been proposed to dynamically adjust the number of poles and/or the number of phases of the motor to provide more freedom to optimize the performance of the motor, especially to improve the efficiency of the motor and the drive system. The number of poles in a machine, and/or the number of phases in a pair of poles may be changed by controlling the currents in the windings, particularly by changing the phase relationship between adjacent windings. However, how to control the motor and implement such a dynamic adjustment of number of poles and/or the number of phases has remained a significant challenge.

It would be desirable to have a high performance motor system with advanced control techniques exhibiting good behaviors such as high efficiency over a variety of speed and power range conditions at a low cost.

SUMMARY

These and other problems are generally solved or circumvented, and technical advantages are generally achieved, by preferred embodiments of the present disclosure which provide a reconfigurable motor system capable of dynamically adjusting the number of poles and/or phases.

In accordance with an embodiment, a method comprises providing a motor comprising a plurality of windings, a rotor and a stator magnetically coupled to the rotor, coupling a plurality of power converters to the plurality of windings, reducing a flux strength and a torque of the motor gradually, after the step of reducing the flux strength and the torque of the motor, controlling the plurality of power converters to dynamically adjust the number of poles of the motor and after the step of controlling the plurality of power converters to dynamically adjust the number of poles of the motor, increasing the flux strength and the torque of the motor gradually.

In accordance with another embodiment, a system comprises a motor having a plurality of windings, a rotor and a stator magnetically coupled to the rotor, wherein the plurality of windings is configured such that the number of poles of the motor can be dynamically adjustable by adjusting currents flowing through the plurality of windings, a plurality of power converters connected to respective windings, wherein the plurality of power converters and the plurality of windings are arranged into a plurality of symmetric groups controlled by a plurality of modulators synchronized by a plurality of interleaved clocks, and wherein gate drive signals in each symmetric group are synchronized to a clock and a controller configured to decide a plurality of operating parameters of the motor to optimize a set of performance parameters of the system.

A power converter of the plurality of power converter is controlled to produce a magnetizing current with a harmonic component.

In accordance with yet another embodiment, a method comprises detecting operating parameters of a motor system comprising a plurality of windings, a rotor, a stator magnetically coupled to the rotor and a plurality of power converters connected to the plurality of windings, determining, by a controller, a suitable pole number and a preliminary set of operating variables based upon the operating parameters, reducing operating stresses of the motor system gradually and after reducing the operating stresses, configuring the plurality of power converters so as to adjust the number of poles of the motor system according to the suitable pole number.

An advantage of an embodiment of the present disclosure is a reconfigurable motor system capable of dynamically adjusting the number of poles and/or phases. As a result, reconfigurable motor system can achieve high performance under a variety of operating conditions.

The foregoing has outlined rather broadly the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures or processes for carrying out the same purposes of the present disclosure. It should also be realized by those skilled in the art that such equivalent constructions do not depart from the spirit and scope of the disclosure as set forth in the appended claims.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the various embodiments and are not necessarily drawn to scale.

DETAILED DESCRIPTION OF ILLUSTRATIVE EMBODIMENTS

Figure 1:
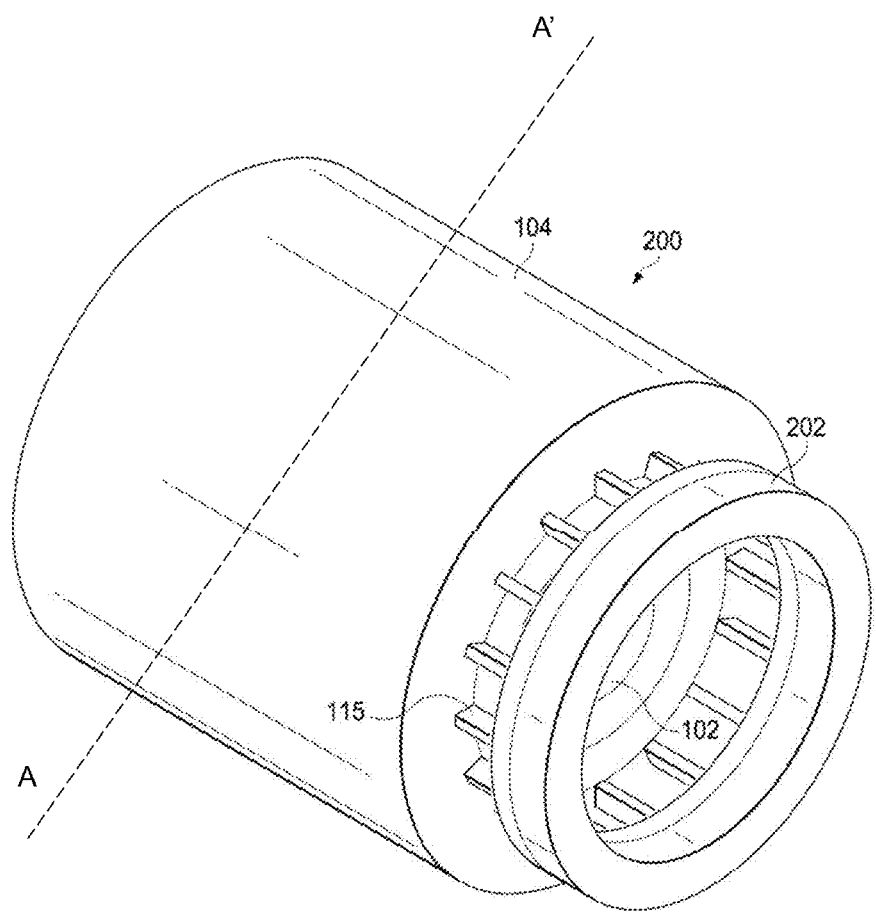
FIG. 1 illustrates a perspective view of a motor system in accordance with various embodiments of the present disclosure.

The making and using of the presently preferred embodiments are discussed in detail below. It should be appreciated, however, that the present disclosure provides many applicable inventive concepts that can be embodied in a wide variety of specific contexts. The specific embodiments discussed are merely illustrative of specific ways to make and use the disclosure, and do not limit the scope of the disclosure.

The present disclosure will be described with respect to preferred embodiments in a specific context, namely a reconfigurable motor system. There are different types of electric machines including induction machines, permanent magnets machines, switching reluctance machines, synchronous reluctance machines, and hybrid machines. The various embodiments in this disclosure are applicable to the electric machines above. The disclosure may also be applied, however, to a variety of electric machines and machine systems. Hereinafter, various embodiments will be explained in detail with reference to the accompanying drawings.

The present disclosure will be described with respect to preferred embodiments in a specific context, namely a dynamically reconfigurable induction motor (DRIM) system/technology for improving the traditional motor technology by dynamically changing the number of poles and/or the number of phases through various power electronics control mechanisms. With the DRIM system/technology, the efficiency and reliability of the system can be significantly increased while the system cost is reduced. It should be noted that the general principles of the innovative aspects in this disclosure may be also applied to electric machines with a fixed number of poles and/or phases.

This disclosure presents further improvements in motor/generator design and manufacturing processes. Although the discussion uses a motor as an example, the same principles can be applicable to generators.

The number of poles and number of phases in a pair of poles in a motor can impact its operation and performance significantly. In traditional motors, the number of poles and the number of phases are determined by the winding construction and connection. In a DRIM motor, the windings are arranged to have open connections. The number of poles (2P) and the number of phases in a pair of poles are determined by the currents flowing through the windings (N), which enables the numbers of P and N to be dynamically changed in real-time operation through controlling the phase relationship of the winding currents. In some embodiments, there may be a plurality of power converters. The plurality of power converters is divided into a plurality of power converter groups. The motor has a plurality of conductors. The plurality of conductors is divided into a plurality of groups of conductors. In some embodiments, the plurality of conductors is divided into the plurality of groups consecutively. In alternative embodiments, the plurality of conductors is divided symmetrically into the plurality of groups of conductors. In some embodiments, the power converters coupled to a group of conductors are configured to control phase relationships of currents flowing through the group of conductors.

This control of the winding currents can be achieved through coupling a plurality of power converters to the windings. A suitable control algorithm is employed to control the operation of the plurality of power converters. As a result, the motor and the associated motor drive system become a software defined system. The operation and performance of the software defined system can be improved over a wide range of operating conditions and with simulated and/or actual operation data through a self-learning and optimizing algorithm with real-time software update capability, thereby resulting in much better performance and cost tradeoffs. The benefits of the software defined system are especially significant for systems with complex operation modes such electrical vehicles. In addition, the energy efficiency, reliability and cost of the system can be improved simultaneously by applying the DRIM technology to the motor. For example, the system can continue to operate even though some windings in the motor, or some parts in a power converter are failed, as the failed parts or failed windings can be isolated and disabled with the rest of the system, which is still working. It is also feasible to disable some power converters and/or some windings to make the system operate with a reduced number of phases to improve system efficiency at light load. The technique of reducing the number of phases of a motor is similar to the phase-shading technique used in dc-dc converters.

FIG. 1 illustrates a perspective view of a motor system in accordance with various embodiments of the present disclosure. The motor system 200 comprises a rotor 102 and a stator 104. The rotor 102 is inside and surrounded by the stator 104. The stator 104 comprises a stator core, a plurality of stator windings and a connection ring 202. The plurality of stator windings (e.g., stator winding 115) is embedded in the stator core. The plurality of stator windings is connected together by the connection ring 202 as shown in FIG. 1. The stator core is formed of suitable magnetic materials. The stator core is able to conduct magnetic flux and provide mechanical support for the plurality of stator windings. In this disclosure, the terms of stator winding, phase winding and phase conductor are usually interchangeable and usually have the same meaning. Depending on the construction of the motor, a phase winding or phase conductor may be located in the rotor also, although the following discussion will generally use such windings in the stator as examples. Throughout the description, the motor system shown in FIG. 1 may be alternatively referred to as a reconfigurable motor system.

Figure 2:
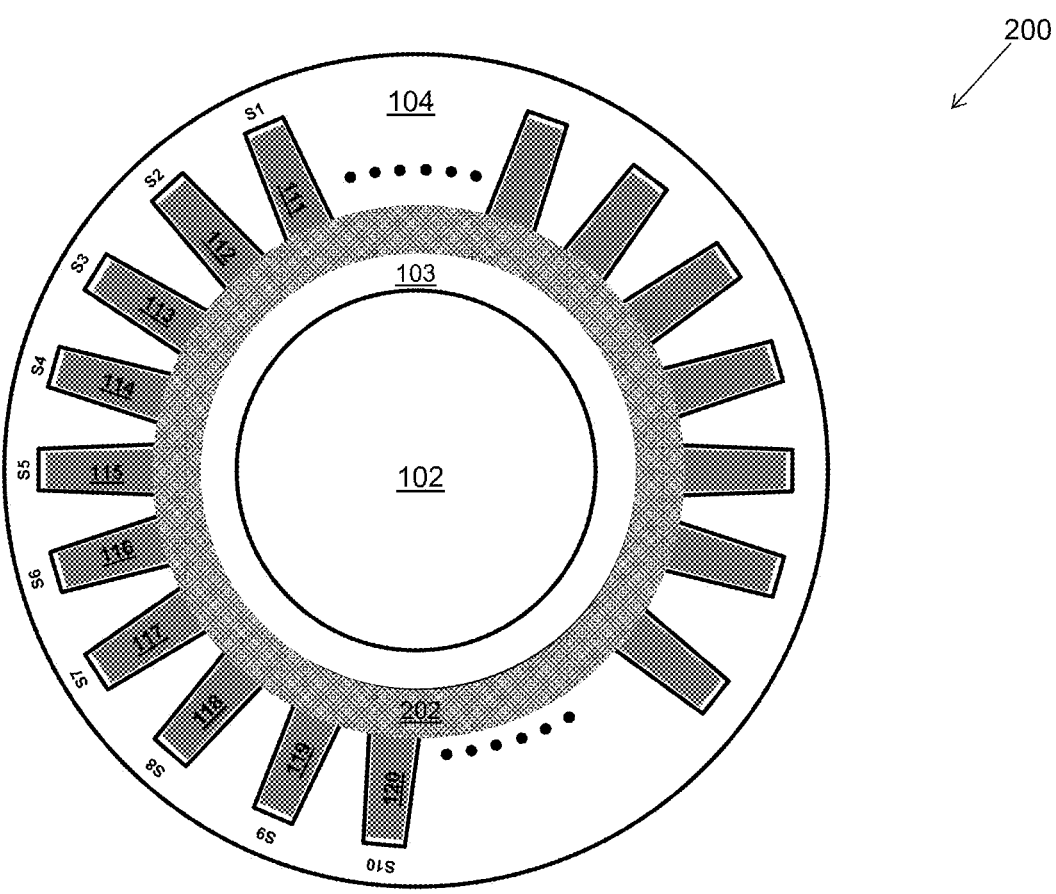
FIG. 2 illustrates a simplified view of the motor system shown in FIG. 1 in accordance with various embodiments of the present disclosure.

FIG. 2 illustrates a simplified view of the motor system shown in FIG. 1 in accordance with various embodiments of the present disclosure. The reconfigurable motor system 200 comprises the rotor 102, the stator 104 and a plurality of phase conductors formed in the stator 104. As shown in FIG. 2, there is an air gap 103 formed between the rotor 102 and the stator 104. A plurality of slots S1-S10 is formed in the stator 104. Each slot (e.g., slot S1) is employed to accommodate one stator winding comprising a phase conductor (e.g., stator winding 111). It should be noted, depending on different designs, more stator windings may be embedded in one slot. As shown in FIG. 2, there may be a plurality of stator windings 111-120 formed in the stator 104. Throughout the description, the stator winding may be alternatively referred to as the phase conductor of the stator.

It should be recognized that while FIG. 2 illustrates the motor system 200 with few slots and stator windings, the motor system 200 could accommodate any number of slots and stator windings. The slots are generally evenly distributed along a perimeter of the motor, and are labeled consecutively. Throughout the description in the present disclosure, the slot and the winding in the slot are generated designated with the same number. For example, S5 shown in FIG. 2 may means the 5th slot or the phase conductor (winding) embedded in the 5th slot, depending on the context of the description.

FIG. 2 further illustrate the connection ring 202. Throughout the description, the connection ring 202 may be alternatively referred to as a ring. As shown in FIG. 2, the ring 202 is placed on one end of the stator 104. The ring 202 is formed of a suitable conductive material. The ring 202 is employed to connect the stator windings together. As shown in FIG. 2, each stator winding has one end connected to the ring 202. The ring 202 allows the currents of all stator windings to be controlled.

It should be noted that the sum of the currents flowing through the stator windings should be equal to zero if the ring 202 is not connected to other nodes of the motor system. If the sum of the currents flowing through the stator windings is not equal to zero, a conductive path should be provided as a return path for the unbalanced currents. The detailed implementations of the return path will be discussed below with respect to FIGS. 12-15.

As shown in FIG. 2, the ring 202 is circular in shape. It should further be noted that the shape of the ring 202 is merely an example. One of ordinary skill in the art would recognize many variations, alternatives, and modifications. For example, it is within the scope and spirit of the disclosure for the ring 202 to comprise other shapes, such as, but not limited to oval, square or rectangle. Throughout the description, the ring may be alternatively referred to as a connection ring or a connection bar.

Figure 3:
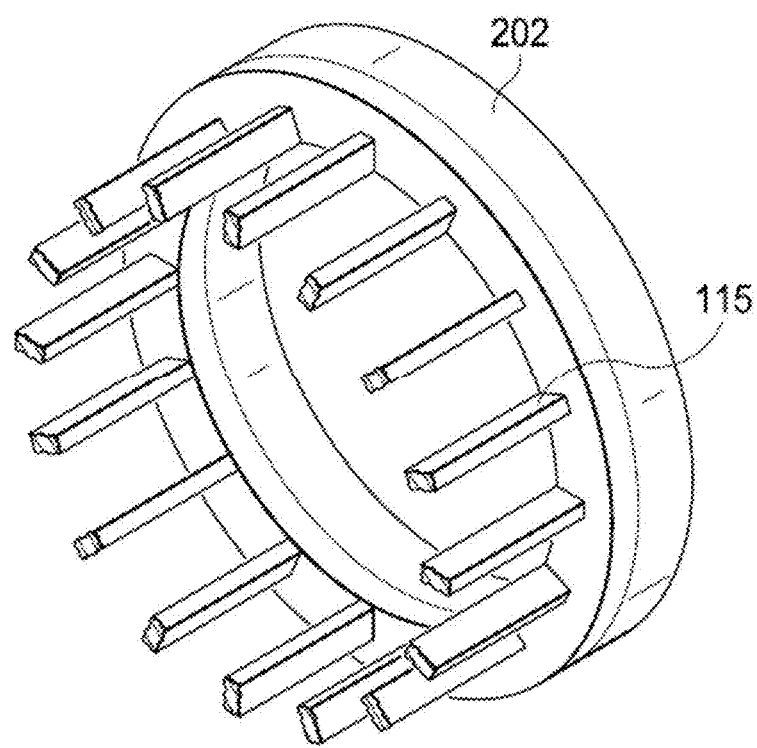
FIG. 3 illustrates a perspective view of the connection ring and the plurality of stator windings of the motor system shown in FIG. 2 in accordance with various embodiments of the present disclosure.

FIG. 3 illustrates a perspective view of the connection ring and the plurality of stator windings of the motor system shown in FIG. 2 in accordance with various embodiments of the present disclosure. The connection ring 202 is circular in shape. One end of each stator winding (e.g., stator winding 115) is connected to the connection ring 202. Since the connection ring 202 is formed of a conductive material. The plurality of stator windings is electrically connected to each other. In the manufacturing process, a phase conductor may be inserted into a slot of a motor as a component. Alternatively, the phase conductor may be manufactured into the slot through suitable processes such as molding, casting, plating or printing processes using a conductive material, separately or together with other phase conductors. The end ring may be manufactured together with the conductors, or separately and then connected to the phase windings afterwards.

In some embodiments, the phase conductor connected to the connection ring 202 is inserted into an opening of the connection ring 202. Alternatively, the end of the phase conductor connected to the connection ring 202 may be connected to the top surface or protruding regions of the connection ring 202. The plurality of stator windings may be connected to the connection ring 202 through various processes such as welding, soldering and the like.

Figure 4:
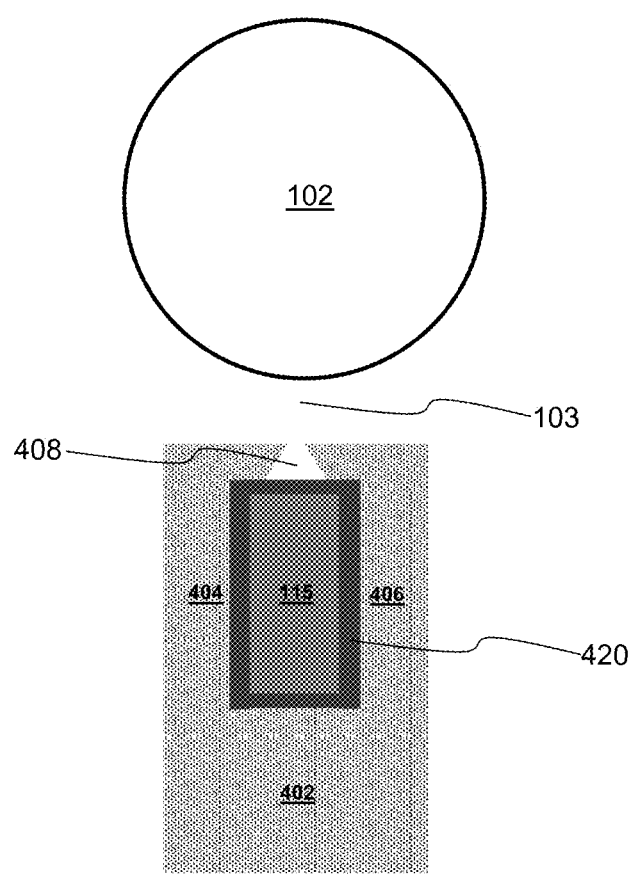
FIG. 4 illustrates a cross sectional view of an area around a stator slot taken along line A-A' in FIG. 1 in accordance with various embodiments of the present disclosure.

FIG. 4 illustrates a cross sectional view of an area around a stator slot taken along line A-A' in FIG. 1 in accordance with various embodiments of the present disclosure. A region 402 is a portion of the stator core called a yolk or s base. A first tooth 404 and a second tooth 406 are formed over the region 402. The region 402 and the teeth 404, 406 are called the core of the stator. The region 402 and the teeth 404, 406 are formed of a magnetic material such as a silicon steel laminate, a ferrite block, or a magnetic compound. A trench 408 is over the region 402 and between the first tooth 404 and the second tooth 406. The trench 408 is alternatively referred to as a slot. The sidewalls and the bottom of the trench may be coated with an insulation layer 420 to withstand a relatively high voltage.

The phase conductor 115 is embedded in the trench. There is usually an insulation layer 420 formed between the phase conductor 115 and the core of the stator if the conductor needs to withstand a relatively high voltage. Over the phase conductor 115, there is usually an opening that is sometimes filled with a mechanical support material, which may or may not be a magnetic-conducting material. In some embodiments, suitable materials such as solder paste may be filled in the slot 408. After a reflowing process, the solder paste forms a cap to further secure the stator winding's position.

As shown in FIG. 4, the stator and the rotor 102 are separated by the air gap 103. For brevity, only one stator winding (e.g., phase conductor 115) has been illustrated in FIG. 4. A person skilled in the art would understand the rotor 102 is surrounded by a plurality of stator windings.

Figure 5:
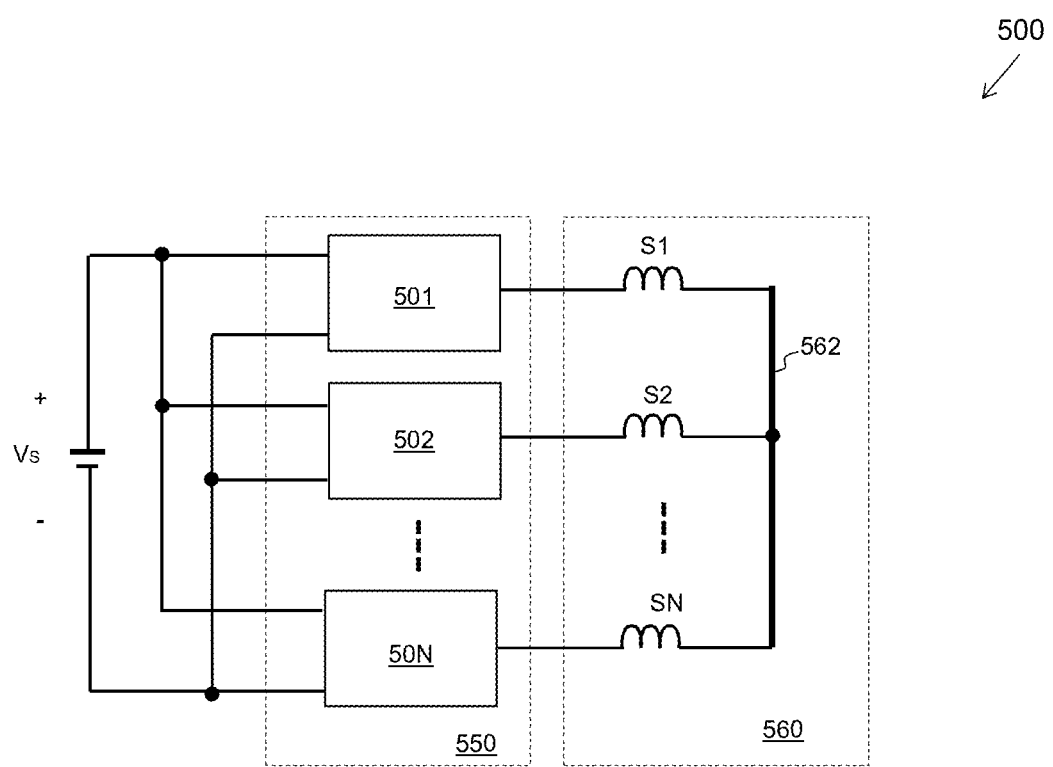
FIG. 5 illustrates a block diagram of a reconfigurable motor system in accordance with various embodiments of the present disclosure.
Figure 10:
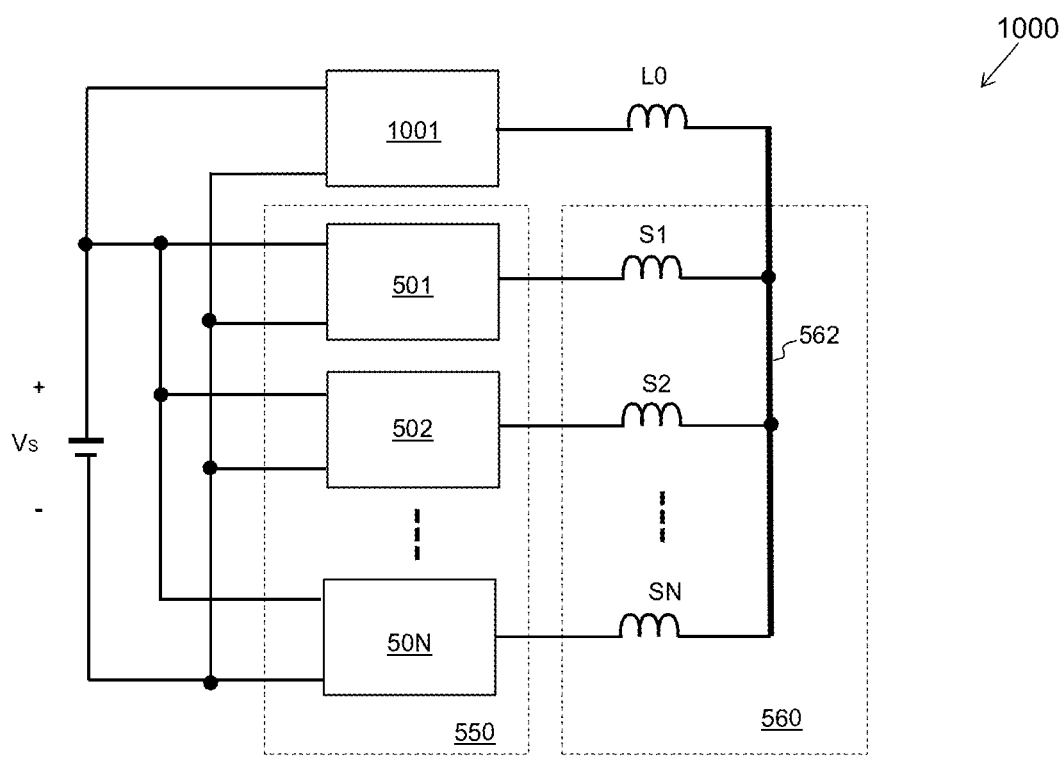
FIG. 10 illustrates a block diagram of another reconfigurable motor system in accordance with various embodiments of the present disclosure.

FIG. 5 illustrates a block diagram of a reconfigurable motor system in accordance with various embodiments of the present disclosure. The reconfigurable motor system 500 comprises a reconfigurable motor 560 and the associated power converter group 550. In some embodiments, the reconfigurable motor 560 can be implemented as the reconfigurable motor shown in FIG. 2. In alternative embodiments, the reconfigurable motor 560 can implemented as any reconfigurable motor. As shown in FIG. 10, the reconfigurable motor 560 comprises a plurality of stator windings S1-SN and a connection ring 562.

The power converter group 550 comprises a plurality of power converters 501-50N. Each power converter (e.g., power converter 501) has an input connected the power source Vs and an output connected a corresponding stator winding (e.g., stator winding S1). As shown in FIG. 5, a first end of the stator winding (e.g., stator winding S1) is connected to the output of the corresponding power converter (e.g., power converter 501). A second end of the stator winding is connected to the connection ring 562. The structure of the power converter will be described in detail below with respect to FIG. 6.

Figure 6:
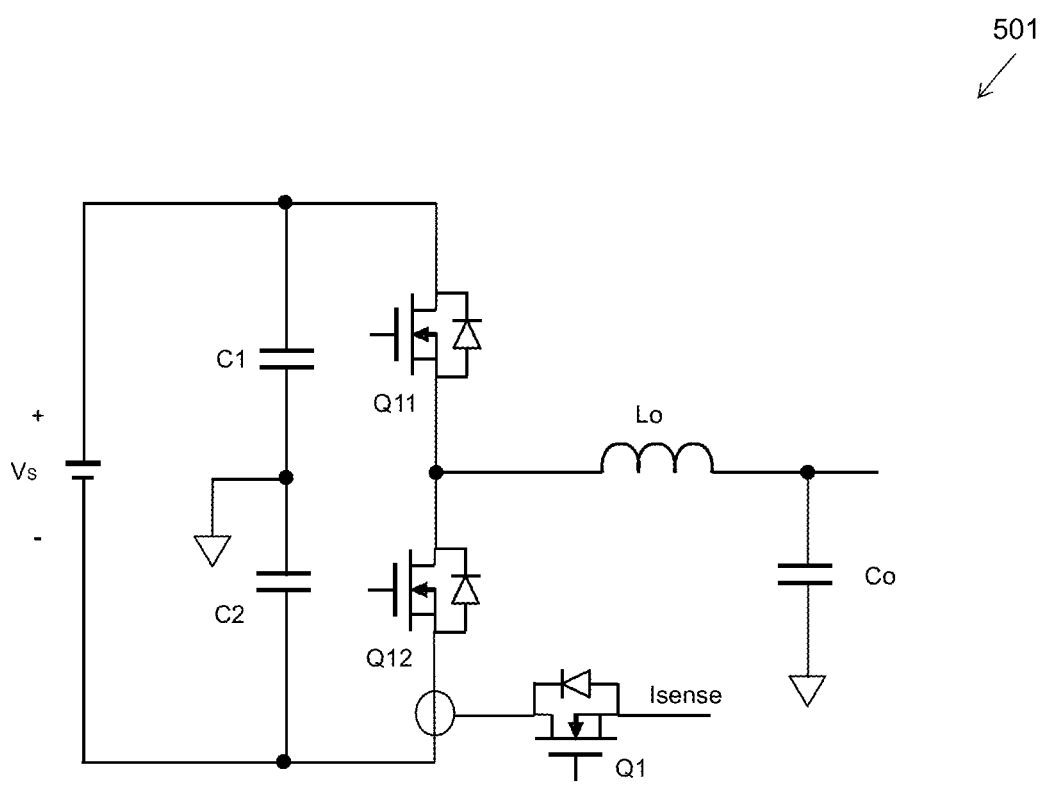
FIG. 6 illustrates a schematic diagram of a power converter suitable for using in the system shown in FIG. 5 in accordance with various embodiments of the present disclosure.

FIG. 6 illustrates a schematic diagram of a power converter suitable for using in the system shown in FIG. 5 in accordance with various embodiments of the present disclosure. In some embodiments, the power converter 501 is implemented as a half-bridge power converter. The half-bridge power converter 501 includes two switching elements, namely Q11 and Q12, and two capacitors, namely C1 and C2. The half-bridge power converter 501 further comprises a sense switch Q1. The control of the sense switch Q1 is configured such that the sense switch Q1 conducts only during Q12's conduction time. The gate drive signal of Q1 can be obtained based on the gate drive signal of Q12. It should be noted that the gate drive signal of Q12 should be shaped to avoid or reduce switching noise of Q12 and Q12. Furthermore, the gate drive signal of Q1 can be generated based on a sample clock whose timing is set to be insensitive to such switching noise.

As shown in FIG. 6, the switching elements Q11 and Q12 are connected in series between the output terminals of the power source Vs. Likewise, the capacitors C1 and C2 are connected in series between the output terminals of the power source Vs. The common node of the switching elements Q11 and Q12 is coupled to an input of an L-C filter formed by an inductor Lo and an output capacitor Co as shown in FIG. 6. The common node of the capacitors C1 and C2 is coupled to ground. Please note that Lo and Co are optional, and the common node of Q11 and Q12 may be directly connected to a conductor of the motor.

According to some embodiments, the switching elements Q11 and Q12 are implemented as MOSFET or MOSFETs connected in parallel, any combinations thereof and/or the like. According to alternative embodiments, the switching elements (e.g., switch Q1) may be an insulated gate bipolar transistor (IGBT) device. Alternatively, the switching elements can be any controllable switches such as integrated gate commutated thyristor (IGCT) devices, gate turn-off thyristor (GTO) devices, silicon controlled rectifier (SCR) devices, junction gate field-effect transistor (JFET) devices, MOS controlled thyristor (MCT) devices, gallium nitride (GaN) based power devices and/or the like.

It should be noted that while the example throughout the description is based upon a half-bridge converter (e.g., half-bridge converter 501 shown in FIG. 6), the implementation of the power converter shown in FIG. 6 may have many variations, alternatives, and modifications. For example, full-bridge converters, push-pull converters and inductor-inductor-capacitor (LLC) resonant converters may be alternatively employed in some suitable applications.

In sum, the half-bridge converter 501 illustrated herein is limited solely for the purpose of clearly illustrating the inventive aspects of the various embodiments. The present invention is not limited to any particular power topology.

It should further be noted that while FIG. 6 illustrates two switches Q11 and Q12, various embodiments of the present disclosure may include other variations, modifications and alternatives. For example, a separate capacitor may be connected in parallel with each switch of the half-bridge converter 501. Such a separate capacitor helps to better control the timing of the resonant process and EMI of the half-bridge converter 501.

Figure 7:
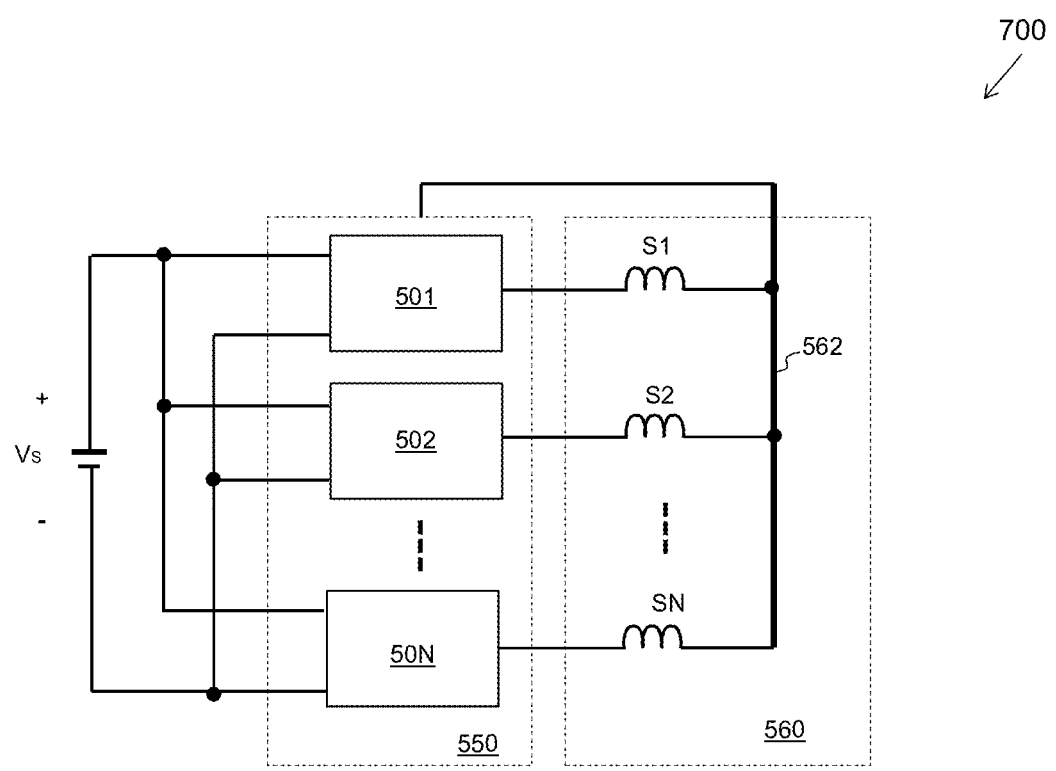
FIG. 7 illustrates a block diagram of another reconfigurable motor system in accordance with various embodiments of the present disclosure.

FIG. 7 illustrates a block diagram of another reconfigurable motor system in accordance with various embodiments of the present disclosure. The reconfigurable motor system 700 shown in FIG. 7 is similar to the reconfigurable motor system 500 shown in FIG. 5 except that the connection ring 562 is coupled to the power converter group 550 through a conductive path. In some embodiments, the connection ring 562 may be connected to the power source Vs through a conductive path, in which there may be some impedance elements or impedance networks such as a capacitor or inductor between the connection ring and the power source. The connection shown in FIG. 7 helps to better control the currents flowing through the stator windings S1-SN. Especially, when the sum of the currents flowing through the stator windings S1-SN is not equal to zero, the conductive path shown in FIG. 7 functions as a return path for the unbalanced currents flowing through the stator windings S1-SN.

In some embodiments, the connection ring 562 may be not circular in shape. For example, there may be one gap or more gaps in the connection ring. In order to pursue better performance, the connection point between the return path and the connection ring 562 may be located at the middle portion of the connection ring 562.

Figure 8:
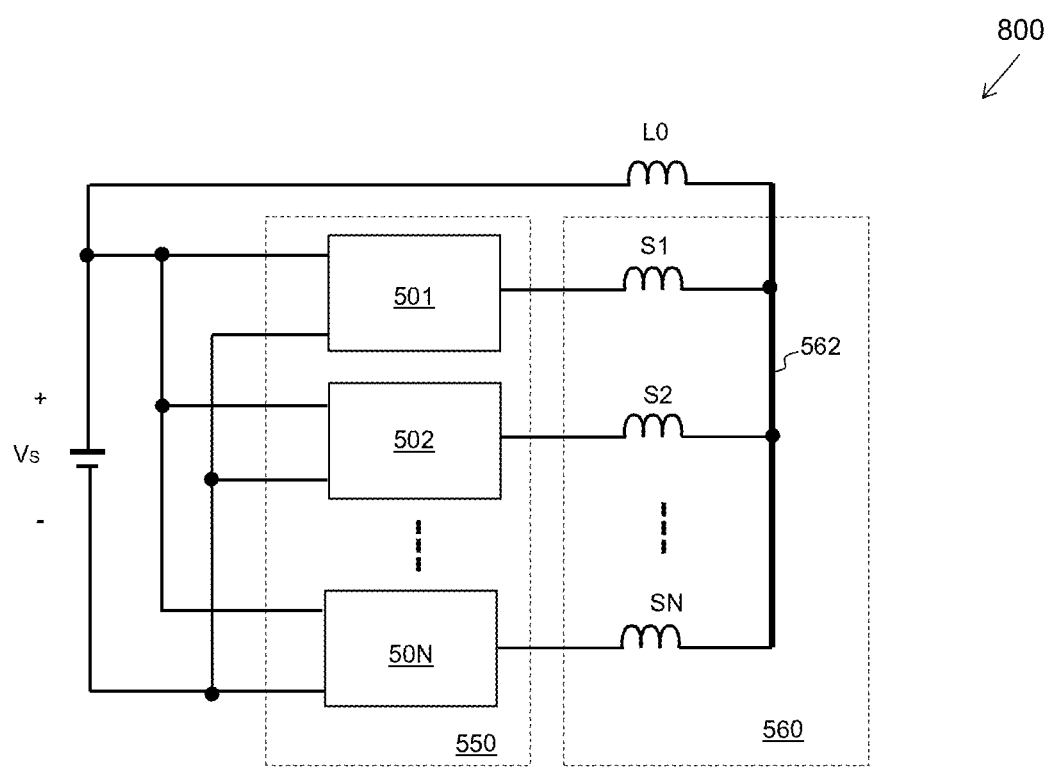
FIG. 8 illustrates a block diagram of another reconfigurable motor system in accordance with various embodiments of the present disclosure.

FIG. 8 illustrates a block diagram of another reconfigurable motor system in accordance with various embodiments of the present disclosure. The reconfigurable motor system 800 is similar to the reconfigurable motor system 700 shown in FIG. 7 except that an inductor L0 is connected between the connection ring 762 and a positive terminal of the power source Vs. One advantageous feature of having the inductor L0 is the inductor L0 may help to reduce the current ripple in the stator windings. The inductor L0 also helps to filter switching noise from the power converters 501-50N.

It should be noted that the inductor L0 may be integrated with the stator core of the reconfigurable motor system 800. In some embodiments, the stator core may comprise magnetic conducting materials such as silicon steel, soft ferrite, any combinations thereof and the like. The inductor L0 may be formed in the stator core. For example, the inductor L0 is implemented as a conductor wound around a portion of the stator core of the reconfigurable motor system 800.

Figure 9:
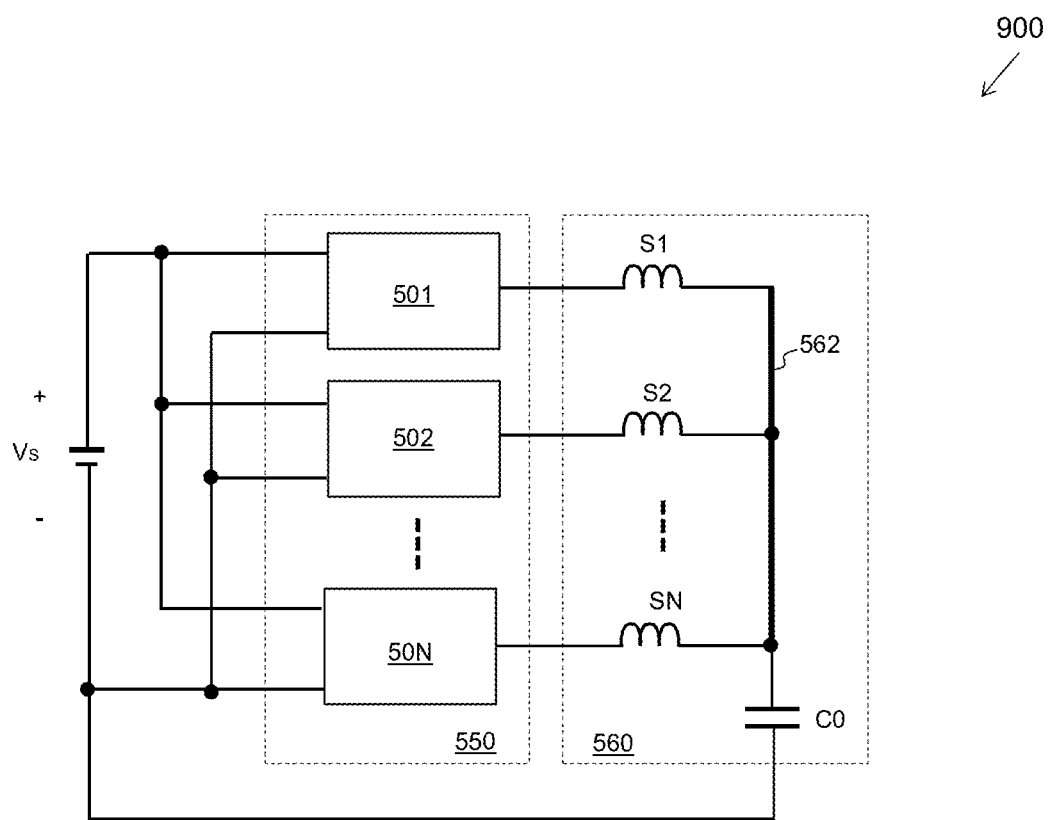
FIG. 9 illustrates a block diagram of another reconfigurable motor system in accordance with various embodiments of the present disclosure.

Although L0 is shown to be coupled to the positive terminal of the power source Vs, it can also be coupled to the negative terminal of the power source Vs or other nodes in the system with a stable voltage potential. In addition, L0 may be replaced by an impedance network with low ac resistance such as a capacitor, a capacitive divider consisting of two capacitors in series couple to the two terminals of Vs or an inductor-capacitor network. The impedance network may also include a power converter so the impedance in the conductive path is controllable. FIG. 9 below shows an example.

FIG. 9 illustrates a block diagram of another reconfigurable motor system in accordance with various embodiments of the present disclosure. The reconfigurable motor system 900 shown in FIG. 9 is similar to the reconfigurable motor system 700 shown in FIG. 7 except that a capacitor is connected between the connection ring 562 and a negative terminal of the power source Vs. One advantageous feature of having the capacitor C0 is the capacitor C0 may help to filter out the ac voltage and keep the connection ring 562 having a stable voltage potential.

It should be noted that, depending design needs, other suitable components such as a protective fuse may be added into the conductive path. Furthermore, in order to avoid a significant parasitic inductance and the associated power losses, the connection wire in a conductive path should be placed outside the stator core of the reconfigurable motor system 900 unless some inductance elements are needed in the connection wire.

FIG. 10 illustrates a block diagram of another reconfigurable motor system in accordance with various embodiments of the present disclosure. The reconfigurable motor system 1000 is similar to the reconfigurable motor system 1000 shown in FIG. 8 except that an impedance power converter 1001 is coupled between an input power source Vs and one end of the windings S1 through SN (optionally through a connection ring or a connection bar 562). An impedance element comprising an inductor L0 may be connected between the impedance power converter and the windings. The power converter 1001 and Lo form an impedance network. The structure of the power converter 1001 is similar to the structure of the power converter 501, and hence is not discussed herein.

One advantageous feature of having the impedance power converter 1001 is the power converter 1001 may help to further improve the performance of the reconfigurable motor system 1000. For example, through controlling the operation of the impedance power converter 1001, the unbalanced current on the connection ring 562 may be controlled within a predetermined range.

The reconfigurable motor systems shown in FIGS. 5-10 may be configured to dynamically change the number of poles and number of phases of the motor through adjusting the phase angels of the winding currents and/or disabling the operation of certain windings through controlling the power converters. One of the key objectives of the motor system is to obtain the best system energy efficiency by coordinating the operation of the motor and the power converters through controlling the amplitude, frequency and phase angle of the motor phase currents (the currents flowing through the windings). As a result, a power loss of a key component in the system, or the combined power loss of the system including any combinations of the power converter loss, motor winding losses, motor magnetic material power losses and other losses, can be minimized over a wide range of operating conditions.

It is possible to operate the motor in a field-weakening mode over a wide range of operation conditions. As the magnetic power losses are heavily influenced by the strength of the magnetic field in the motor. In most conditions and/or applications, a motor doesn't need to operate at or near its rated torque. As such, both its flux strength and the amplitude of winding currents can be adjusted in response to its operating conditions.

In some embodiments, the power source may be implemented as a plurality of power sources connected in series. Alternatively, the power source may be of a high voltage potential. The power source applied to the reconfigurable motor system can be divided into several input voltage sources having a lower voltage rating. In response to the multiple input voltage sources divided from the power source, the phase windings may be divided into several groups. The phase windings in each group may be connected to a separate connection bar as well as coupled to a separate input voltage sources. This configuration (multiple winding groups, multiple connection bars and multiple input voltage sources) for high input voltage applications will be described below with respect to FIGS. 11-15.

Figure 11:
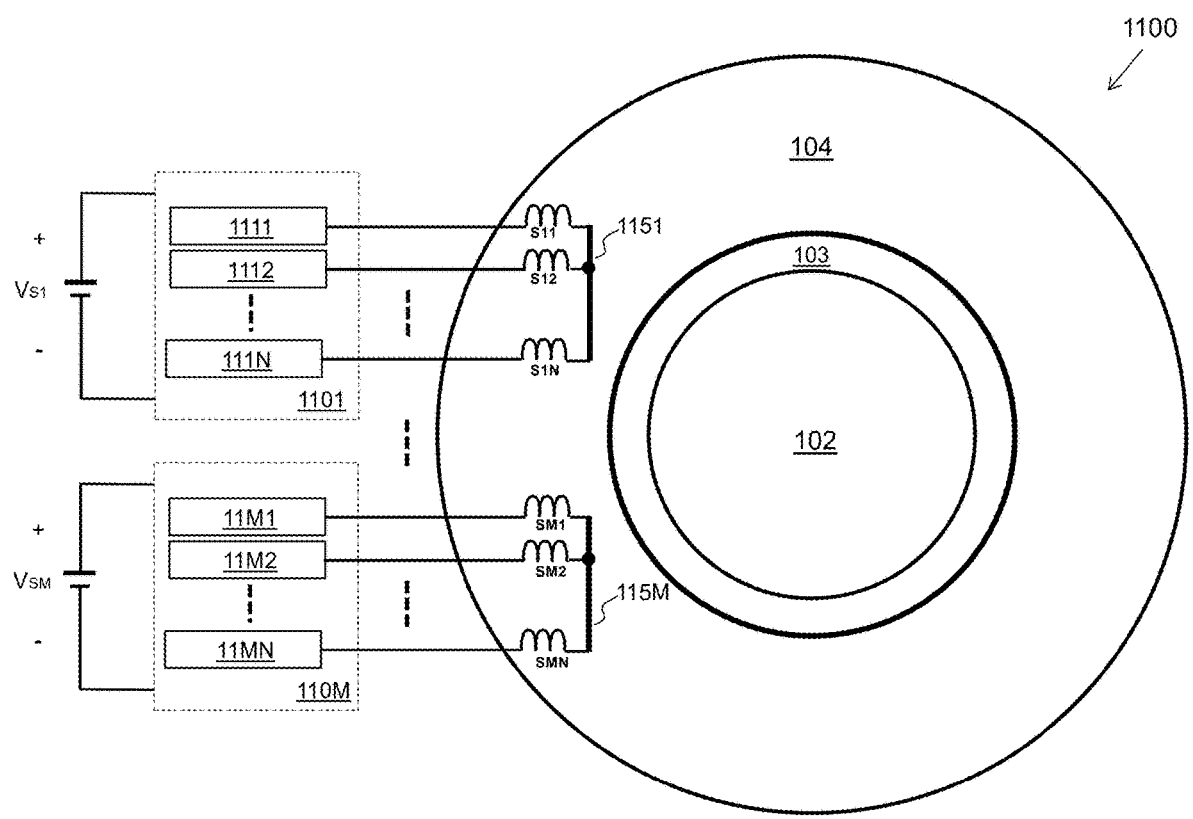
FIG. 11 illustrates a block diagram of a reconfigurable motor system having multiple winding groups in accordance with various embodiments of the present disclosure.

FIG. 11 illustrates a block diagram of a reconfigurable motor system having multiple winding groups in accordance with various embodiments of the present disclosure. The reconfigurable motor system 1100 comprises a stator 104, a rotor 102 and an air gap 103. The stator 104 comprises a plurality of stator windings. The plurality of stator windings may be embedded in the stator core. More particularly, the stator core may comprise a plurality of slots. Each slot is employed to accommodate one stator winding. Alternatively, depending on different applications and design needs, each slot may be employed to accommodate multiple stator windings. In addition, the reconfigurable motor system may not include a stator core (e.g., a coreless motor), or there is no slot in the stator core.

As shown in FIG. 11, the plurality of stator windings is divided into M groups, where M is a predetermined integer. The stator windings of each group are connected by a connection ring. For example, the stator windings S11-S1N of the first group are connected by a first connection ring 1151 as shown in FIG. 11. Likewise, the stator windings SM1-SMN of the mth group are connected by an Mth connection ring 115M as shown in FIG. 11. In FIG. 11, the connection rings are shown floating (e.g., the connection rings are isolated from each other as shown in FIG. 11). In this disclosure, a connection ring may not be an enclosed shape, and thus can be a connection bar. If some of the M input power sources are isolated from each other, some of the connection rings 1151-115M may be electrically connected together, or form a single connection ring.

Furthermore, the reconfigurable motor system 1100 comprises a plurality of power converter groups. Each power converter group is connected between a power source and a corresponding stator winding group. As shown in FIG. 11, a first power converter group 1101 is connected between a first power source VS1 and the first group of the stator windings S11-S1N. The first power converter group 1101 comprises a plurality of power converters 1111-111N as shown in FIG. 11. Likewise, an Mth power converter group 110M is connected between an mth power source VSM and the mth group of the stator windings SM1-SMN. The Mth power converter group 110M comprises a plurality of power converters 11M1-11MN as shown in FIG. 11. In some embodiments, the plurality of power converters is divided into a plurality of power converter groups sequentially.

In some embodiments, the power sources VS1-VSM are separate power sources as shown in FIG. 11. In alternative embodiments, the power sources VS1-VSM are connected in series to accommodate a high input voltage applied to the reconfigurable motor system 1100. Furthermore, the power sources VS1-VSM may be developed from capacitors connected in series and coupled to a common power source. Thus, it may be important to achieve a charge balance among the power sources. In order to accomplish a charge balance of the power sources connected in series, it is desirable that the dc currents flowing in/out of the power sources are equal or approximately equal (e.g., within 20% tolerance) to each other.

In some embodiments, the power sources can perform efficiently and reliably when the current flowing through each power source is a dc current or a current having low low-frequency components. For example, the harmonic components (e.g., the fundamental and the low order harmonics) of the current should be reduced down to the minimum. In some embodiments, each winding group should have at least three stator windings evenly spaced in a pair of poles. The stator windings are configured to conduct currents with the same amplitude and frequency. Furthermore, the phase angles of the currents are evenly distributed among the stator windings. As a result, the stator windings in each winding group form a symmetrical and balanced multi-phase system, and the current flowing through each power source is a dc current in ideal operation.

Figure 12:
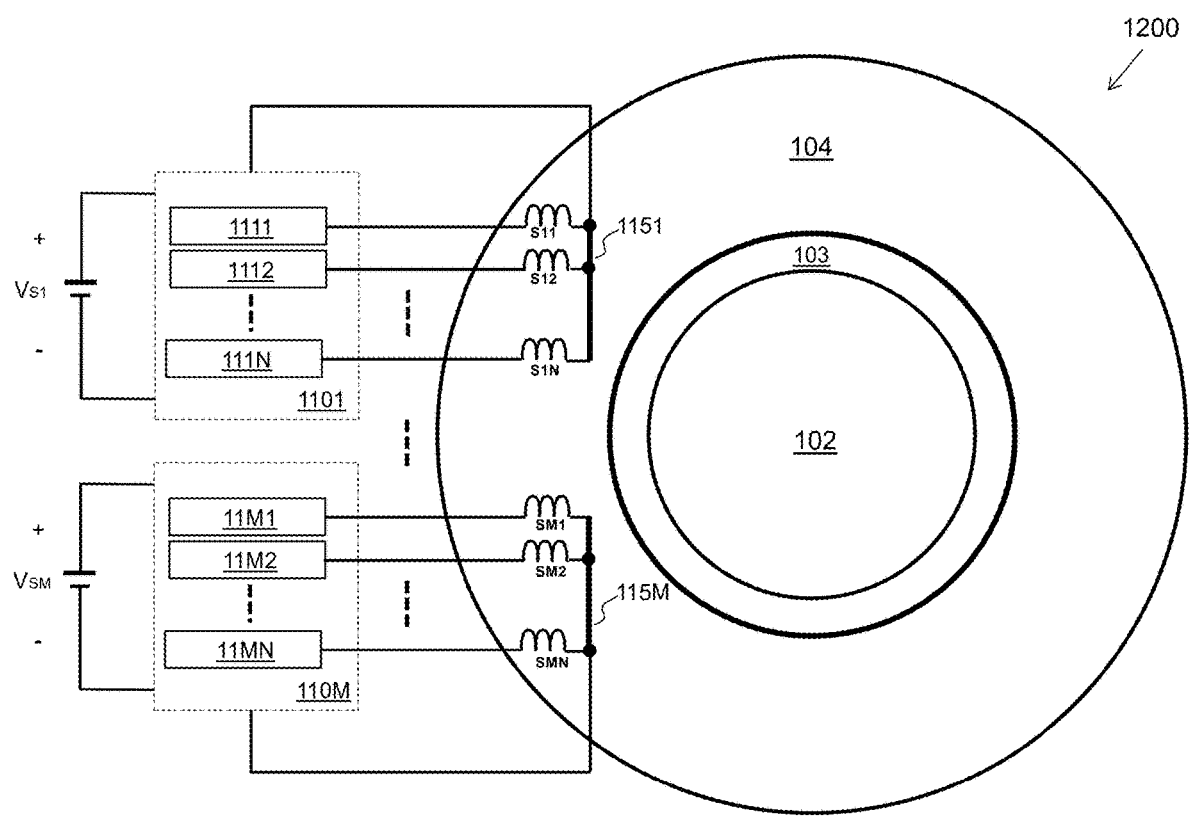
FIG. 12 illustrates a block diagram of another reconfigurable motor system having multiple winding groups in accordance with various embodiments of the present disclosure.

FIG. 12 illustrates a block diagram of another reconfigurable motor system having multiple winding groups in accordance with various embodiments of the present disclosure. The reconfigurable motor system 1200 is similar to the reconfigurable motor system 1100 shown in FIG. 11 except that a return path is connected to each stator winding group.

The connection shown in FIG. 12 helps to better control the currents flowing through the stator windings S1-SN. Especially, when the sum of the currents flowing through the stator windings S1-SN is not equal to zero, the conductive path shown in FIG. 12 functions as a return path for the unbalanced currents flowing through the stator windings S1-SN.

Figure 13:
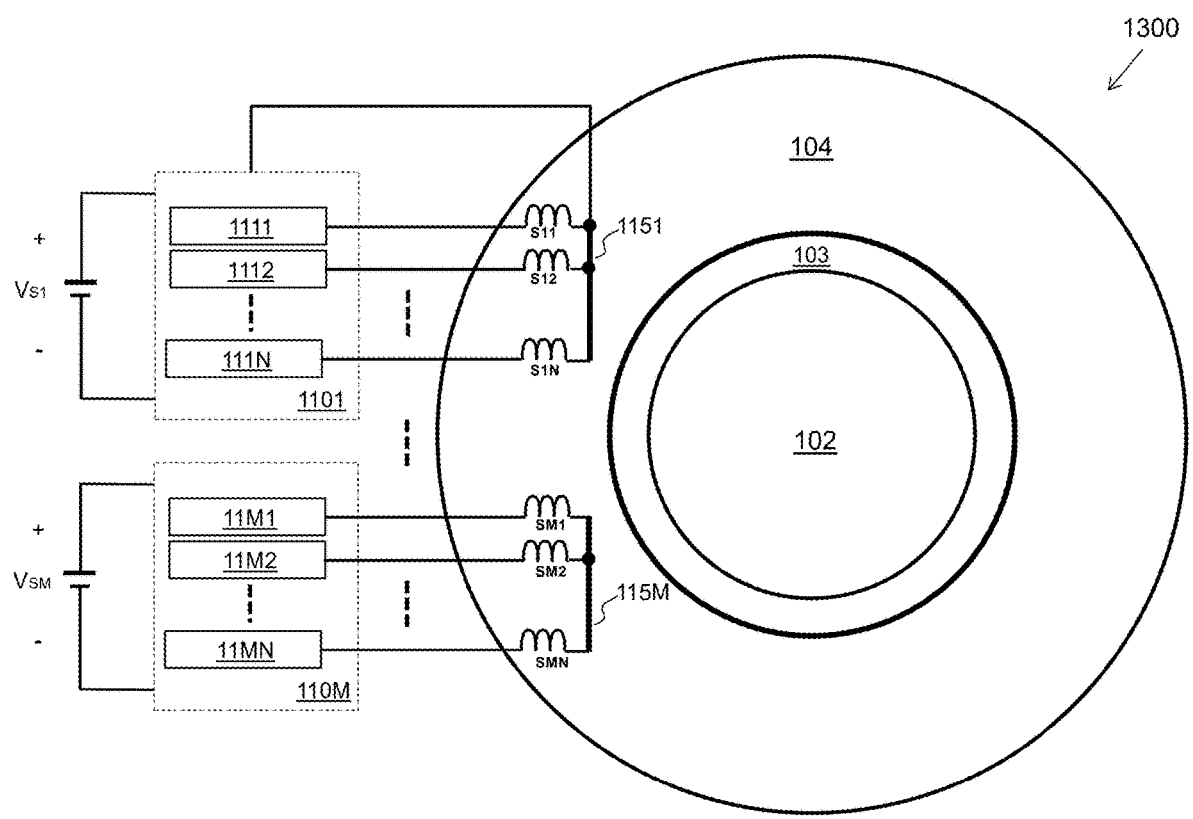
FIG. 13 illustrates a block diagram of yet another reconfigurable motor system having multiple winding groups in accordance with various embodiments of the present disclosure.

FIG. 13 illustrates a block diagram of yet another reconfigurable motor system having multiple winding groups in accordance with various embodiments of the present disclosure. The reconfigurable motor system 1300 is similar to the reconfigurable motor system 1100 shown in FIG. 11 except that a return path is connected to some stator winding groups. At least one stator winding group is not connected with a return path.

Figure 14:
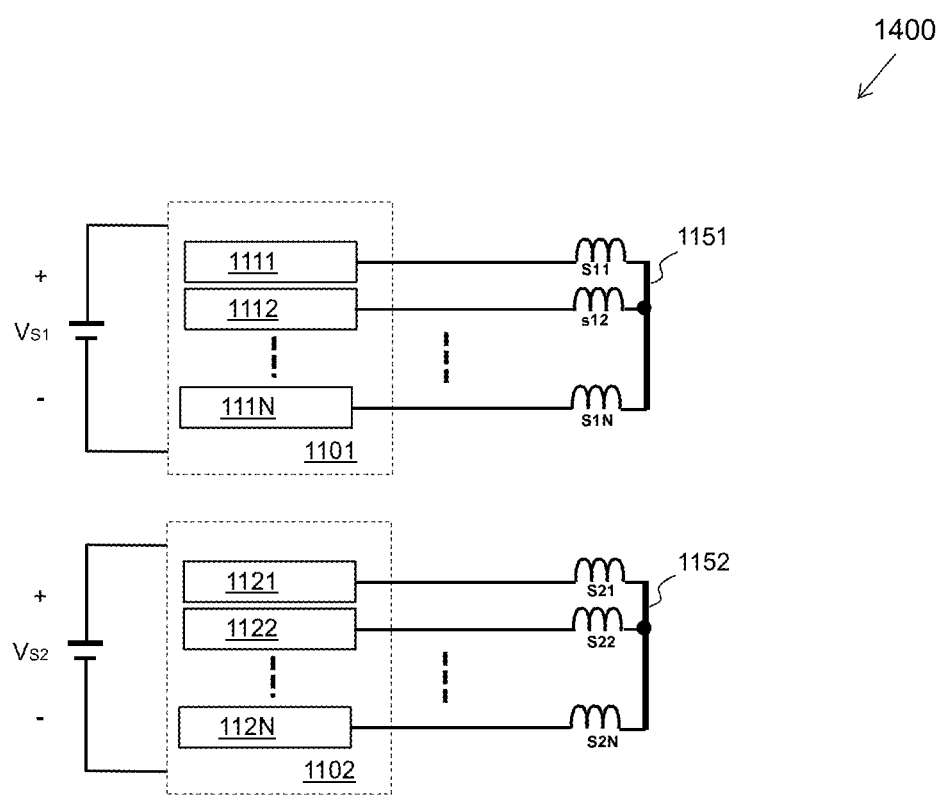
FIG. 14 illustrates a block diagram of a reconfigurable motor system having two winding groups in accordance with various embodiments of the present disclosure.

FIG. 14 illustrates a block diagram of a reconfigurable motor system having two winding groups in accordance with various embodiments of the present disclosure. The reconfigurable motor system 1100 shown in FIG. 11 has M winding groups. When the predetermined integer M is equal to two, the reconfigurable motor system 1100 shown in FIG. 11 becomes the reconfigurable motor system 1400 shown in FIG. 14.

As shown in FIG. 14, a first winding group comprises stator windings S11-S1N. The stator windings S11-S1N are connected together by a first connection ring 1151. A second winding group comprises stator windings S21-S2N. The stator windings S21-S2N are connected together by a second connection ring 1152. A first power converter group 1101 is connected between a first power source VS1 and the first group of the stator windings. The first power converter group 1101 comprises a plurality of power converters 1111-111N as shown in FIG. 14. Likewise, a second power converter group 1102 is connected between a second power source VS2 and the second group of the stator windings. The second power converter group 1102 comprises a plurality of power converters 1121-112N as shown in FIG. 14. If VS1 and VS2 are isolated from each other, the connection rings 1151 and 1152 may be connected electrically together, and in some embodiments may form one connection ring.

Figure 15:
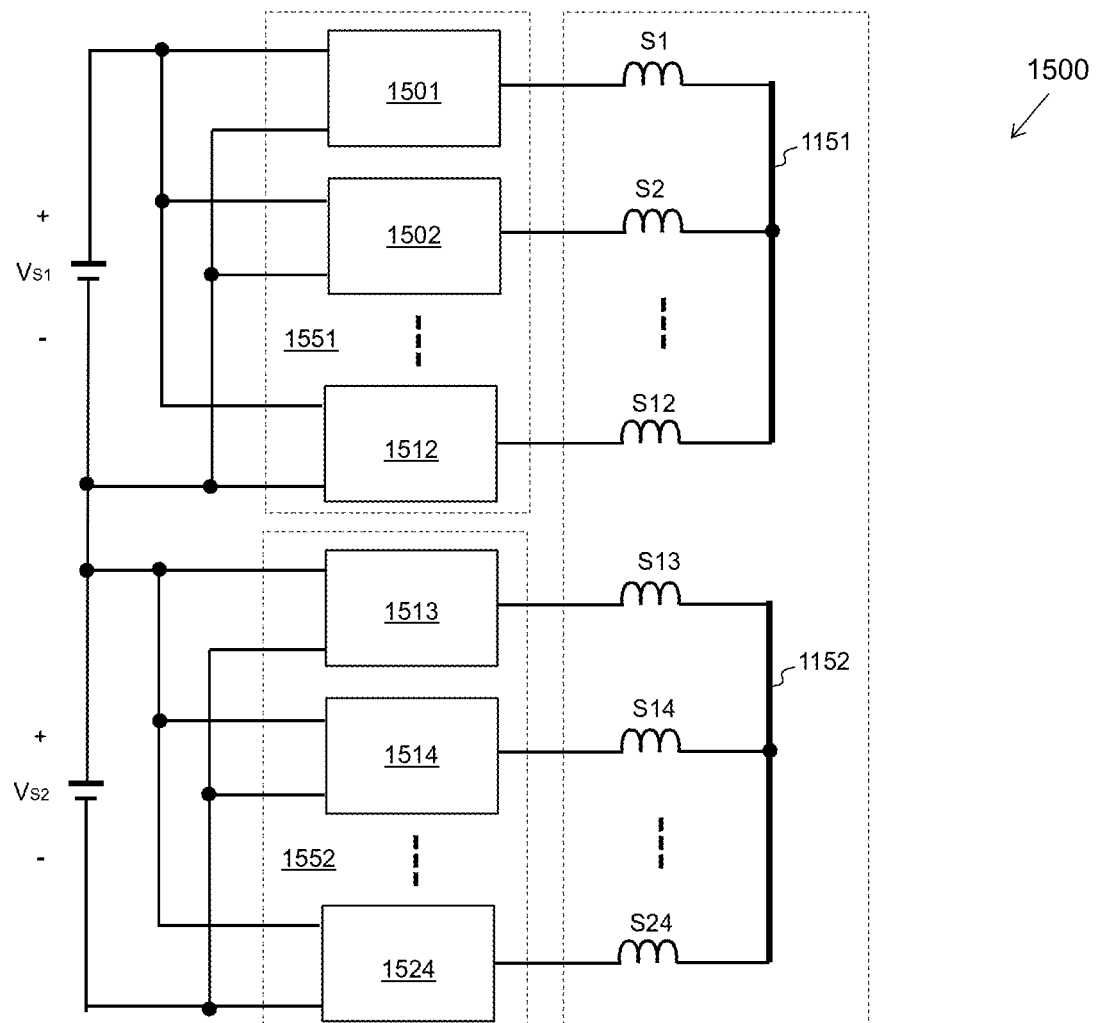
FIG. 15 illustrates a block diagram of another reconfigurable motor system having two winding groups in accordance with various embodiments of the present disclosure.

FIG. 15 illustrates a block diagram of another reconfigurable motor system having two winding groups in accordance with various embodiments of the present disclosure. The reconfigurable motor system 1500 is similar to the reconfigurable motor system 1400 shown in FIG. 14 except that each winding group comprises twelve windings in consecutive slots. As shown in FIG. 15, the first winding group comprises windings from S1 to S12. The second winding group comprises windings from S13 to S24. Similarly, each power converter group comprises twelve power converters, each of which is coupled to a stator winding as shown in FIG. 15.

As shown in FIG. 15, the first winding group comprises stator windings S1-S12. The second winding group comprises stator windings S13-S24. The first power converter group comprises power converters 1501-1512. The second power converter group comprises power converters 1513-1524.

It should be noted that the input power sources VS1 and VS2 are connected in series for enduring a high voltage applied to the reconfigurable motor system 1500.

The control system of the DRIM system is configured to dynamically change the number of poles and the number of phases in a pair of poles of the motor through adjusting the phase angels of the winding currents, and/or disabling certain windings or power converters, so the performance of the system can be maintained at good levels while satisfying operational requirements of the DRIM system.

For vehicular and many other applications, one of the key objectives of the DRIM system may be to improve the system energy efficiency over a wide operation range by coordinating the operation of the motor and the power converters through adjusting the amplitude, frequency and angel of the motor phase currents, so that the combined power losses, including the power converter loss, the motor winding loss and the motor magnetic material power loss can be minimized over a wide range of operating conditions.

The power loss of the power converters is related to the amplitude of the winding currents. The motor winding loss is directly related to the amplitude and frequency of the winding currents. The core loss (magnetic material power loss) of the motor is affected by the frequency and magnitude of the magnetic field in the magnetic material. The losses above are also temperature and switching frequency dependent. Changing the number of poles results in a variation in the frequency of the winding currents and magnetic field.

The amplitude relationship between the connection bar and the phase winding currents, and the flux amplitude relationship between the yolk and the tooth portions of magnetic materials in the motor play a very important factor in obtaining optimum efficiency at a given operating condition. Changing the number of phases in a pair of poles may be a natural outcome of a pole number change or a failure of a winding or a power converter, and may be intentionally controlled during light-load operation conditions by disabling some power converters (not switching the power switches in the power converter), so the power loss in the system may be reduced at light load.

The general operational requirement of a motor drive system is to provide a required torque at a given speed. To optimize the system energy efficiency, it may involve operating the motor in a field-weakening mode during a wide range of operating conditions, as the magnetic power losses are heavily influenced by the strength of the magnetic field in the motor. Therefore, field-oriented control (FOC) methods with capability to control the flux strength in the motor should be employed in the DRIM system generally. V/F control indirectly controlling flux strength may also be used.

Figure 16:
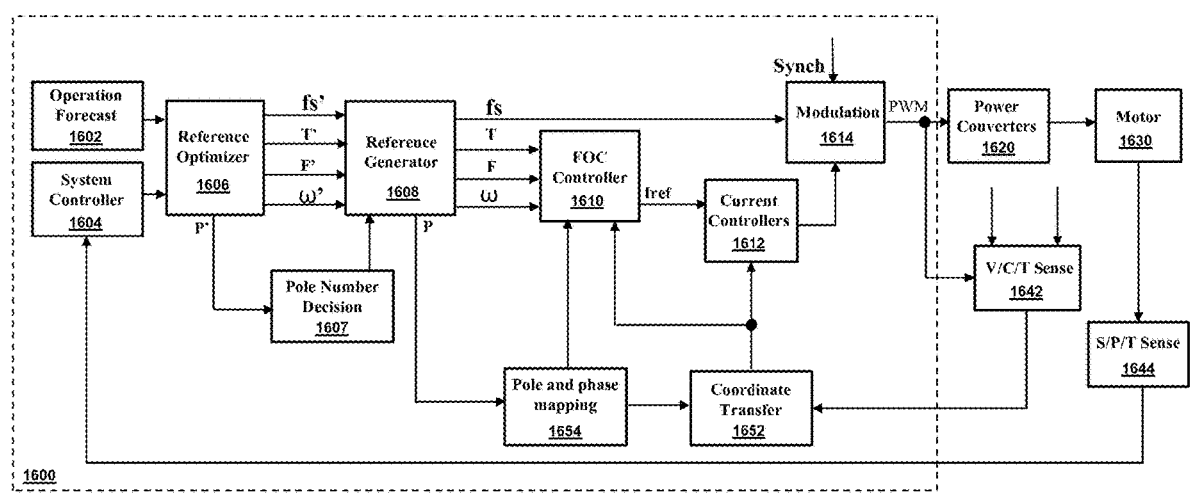
FIG. 16 illustrates a block diagram of a first implementation of a control system of the reconfigurable motor system in accordance with various embodiments of the present disclosure.

FIG. 16 illustrates a block diagram of a first implementation of a control system of the reconfigurable motor system in accordance with various embodiments of the present disclosure. The motor system comprises a motor 1630, a plurality of power converters 1620 and a controller 1600. In order to generate control signals for the power converters and control the motor in an efficient manner, a plurality of system operation parameters may be fed into the controller 1600. As shown in FIG. 16, a first sense apparatus 1642 may be employed to detect voltage, current and/or temperature signals of the power converters. The output of the first sense apparatus 1642 is fed into the controller 1600. A second sense apparatus 1644 may be employed to detect speed, position and/or temperature of the motor 1630. The output of the second sense apparatus 1644 is fed into the controller 1600 as shown in FIG. 16.

The controller 1600 comprises a plurality of functional units. As shown in FIG. 16, a system controller 1604 is configured to receive the output signal from the second sense apparatus 1644. The system controller 1604 can output a required torque as a reference signal according to system requirements and/or system feedback signals such as speed, position, temperature and other operation parameters from the motor or a system component.

An output of the system controller 1604 and an output of an operation forecast unit 1602 are fed into a reference optimizer 1606. The operation the forecast unit 1602 may take inputs from the system input. For example, the system input is from the autonomous driving control of a car, traffic forecast or traffic information of a road, or the work schedule of the drive system. The operation the forecast unit 1602 may also take inputs from historical data such as actual or simulated drive history data. Artificial intelligence may be used to formulate a set of reference variable as there may be huge data available and significant freedom in meeting the basic operation requirements of the system while optimize a set of performance parameters such as system efficiency, motor efficiency, or power converter power losses. As shown in FIG. 16, the reference optimizer 1606 may have five outputs, namely a first output generating a reference switching frequency signal (fs'), a second output generating a reference torque signal (T'), a third output generating a reference flux strength signal (F'), a fourth output generating a reference current frequency signal (ω') and a fifth output generating a reference signal (P') for determining the number of the poles of the motor system. It should be noted the current frequency above is related to the angular frequency of the motor. Since the number of poles of the motor is not fixed, the angular frequency of the motor is replaced by the current frequency to reflect the unfixed number of poles. In some embodiments, not all these five signals are generated in the reference optimizer and reference generator, and a smaller set of signals may be generated instead. As long as the flux strength and the torque are reduced, the system will operate in a low-stress operating mode. In addition, in another embodiment, the reference optimizer 1606 may have a different set of outputs.

In operation, based on various operating parameters and optimization objectives, the reference optimizer 1606 may generate a preliminary set of reference signals such as the reference torque signal (T'), the reference flux strength signal (F'), the reference signal (P') for determining the number of pole pairs, the reference current frequency signal (ω') and the reference switching frequency signal (fs'). Throughout the description, the preliminary set of reference signals may be alternatively referred to as the operating variables of the motor system.

The various operating parameters may include the required torque, operation requirements, and forecast of future operation conditions (e.g., traffic data from an autonomous drive system or a GPS system). The optimization objectives may include energy efficiency and a plurality of user-defined objectives. For example, if a driver of an electrical vehicle has a tendency to have fast acceleration, the reference optimizer 1606 may put more emphasis on acceleration capability of the drive system by generating a reference flux strength signal higher than normal to produce the fast acceleration. Furthermore, in order to achieve the optimization objectives, suitable data analysis methods such as artificial intelligence may be employed to make the reference optimizer 1606 better and more flexible.

The reference switching frequency signal, the reference torque signal, the reference flux strength signal and the reference current frequency signal are fed into a reference generator 1608 directly. The reference signal (P') is fed into the reference generator 1608 through a pole number decision unit 1607.

As energy efficiency becomes an increasing important factor in many motor systems, more detailed energy efficiency optimization needs to be investigated. The key selectable parameters with a significant impact on the system efficiency for a given torque and speed requirement in a DRIM motor system includes magnetic strength (F), number of pole pairs (P) which determines current frequency, and the number of phases in a pair of poles (M) and switching frequency (fs). The switching frequency fs may be selected based on winding current information alone. For example, the switching frequency may be reduced when the current is high or very low to reduce switching power losses. Similarly, the number of phases (M) may be intentionally reduced when the winding current is very low.

The complex part of the energy efficiency optimization is how to choose the right values for F and P, especially F. As is well known in the industry, a stator winding current in an induction motor can be divided into two orthogonal components. A first orthogonal component is a magnetizing current contributing to establish a proper airgap magnetic field whose strength is approximately proportional to the amplitude of the magnetizing current (Im). A second orthogonal component is a torque current to directly produce a mechanical torque, which is approximately proportional to the product of the airgap flux strengthen and torque current amplitude (It).

As part of a motor's magnetic material may get into various degrees of saturation during various modes of operation, in operation modes with a high airgap flux density, higher order harmonic currents may be added into the magnetizing current reference for all or some of the phases in the motor. The sum of such harmonic currents may not be zero in a phase. As a result, the connection bar in a group having unbalanced currents may be coupled to the input power source through a power converter or other means to provide a conduction path for such harmonic currents as shown in FIGS. 7-10.

Fundamentally the efficiency optimization involves finding the best values for Im and It for a set of P values. The best values for Im and It for the P values are suitable for M because M naturally changes with P in the DRIM motor. It should be noted that some phases may be disabled during a light load operating condition. Since the power loss can be calculated analytically in real time based on design and testing data, the reference optimizer 1606 may be implemented with an analytical formula to predict the power losses and choose the best set of parameters in a given operation condition.

Alternatively, the power loss data may be stored in the control system so that the reference optimizer 1606 may use the power loss data through a look up table during the optimization process. Additionally, the reference optimizer 1606 may employ artificial intelligence techniques such as various neural network and deep-learning algorithms to adaptively perform the optimization based on the design data, the simulation data, the testing data and/or the historical operation data. The data and formula may include the effect from temperature variations. Operation limits such as minimum or maximum flux strengths and/or maximum currents can also be considered in this optimization process.

The preliminary reference signals from the reference optimizer 1606 are based on steady-state operation. An important function of the DCIM control system is to have a smooth transition during the process of changing the number of poles. The smooth transition can be achieved through the reference generator 1608.

As shown in FIG. 16, the reference generator 1608 has five outputs generating the switching frequency signal (fs), the torque signal (T), the flux strength signal (F), the current frequency signal (ω) and the signal (P) for determining the number of the poles of the motor system. The outputs may be a complete combination of these five signals, which may be a complete set of these five signals, or a partial set of these signals with some signals not included. As long as the flux strength and the torque of the motor are reduced significantly, the system should be in a low stress state (e.g., a low stress operating mode) which allows the pole number of the motor to be changed in a smooth fashion.

The reference generator 1608 is employed to modify the preliminary reference signals during a pole-change transition and generate formal reference signals for torque (T), flux strength (F), current frequency (ω) and switching frequency (fs). In particular, the reference generator 1608 may reduce the flux strength and/or the torque of the motor gradually so that the voltage and current in the motor and power converters are reduced significantly, and the system operates in a low stress mode. After reducing the flux strength and/or the torque of the motor, the power converters are configured to dynamically adjust the number of poles of the motor. The detailed operation principle of the reference generator 1608 will be discussed below with respect to FIG. 18.

As shown in FIG. 16, the switching frequency signal is fed into a modulation unit 1614 for determining the switching frequency of the PWM signal generated by the controller 1600. The signal (P) is sent to a pole and phase mapping unit 1654 wherein it is converted into a first pole/phase adjustment instruction and a second pole/phase adjustment instruction. There may be a coordinate transfer unit 1652 to receive the signal from the output of the first sense apparatus 1642 and the first pole/phase adjustment instruction from the pole and phase mapping unit 1654. Based upon the received signals, the coordinate transfer unit 1652 may generates a set of signals in the desired coordinate for control use.

The Field-Oriented Control (FOC) controller 1610 may be employed to generate various references for winding currents. As shown in FIG. 16, the references are fed into the current controllers 1612 to generate control signals for the power switches of the power converters 1620. Many FOC methods are known in the industry and are not repeated here. It should be noted that some of the FOC methods need to observe the flux linkage in the motor.

The FOC and/or current control above may require a coordinate transfer unit to convert current/voltage/flux signals between two different coordinate systems. For example, a coordinate transfer unit is employed to convert a set of signals from a stationary phasor system to a synchronous d-q system. Coordinate transfer is a well-known technique in the motor control, and hence is not discussed herein.

The pole and phase mapping unit 1654 is employed to determine the phase angle relationship of winding currents/voltages and the associated variables in different pole and phase configurations.

As shown in FIG. 16, the FOC controller 1610 receives the torque signal (T), the flux strength signal (F) and the current frequency signal ($\omega$) from the reference generator 1608, the second pole/phase adjustment instruction form the pole and phase mapping unit 1654 and the coordinate signal from the coordinate transfer unit 1652. The FOC controller 1610 generates a plurality of reference current signals Iref, which is fed into a set of current controllers 1612. As shown in FIG. 16, the current controllers 1612 may receive both the coordinate signals from the coordinate transfer unit 1652 and the reference current signals from the FOC controller 1610. Based upon these signals, the current controllers 1612 generates a current control signal or a plurality of current control signals, which is fed into the modulation unit 1614.

The modulation unit 1614 is employed to convert the control signal from the current controllers 1612 to gate drive signals for the power switches in power converters 1620. In some embodiments, the modulation unit 1614 may be located in the control system of the motor. Alternatively, the modulation unit 1614 may be in each or some power converters of the power converters 1620. The modulation unit 1614 may be implemented as software codes, a hardware circuit and the like.

As there are multiple power converters in a DRIM system, there may be multiple modulators in the modulation unit 1614. It may be desirable to synchronize the switching action of power switches in different power converters to one or more synchronization signals (Synch). A synchronization signal is usually a special clock signal with a regular interval and pulse width suitable to cause the gate drive signal coupled to it to be synchronized at the center or along an edge. The synchronization may reduce the ripple of winding currents and the motor flux, thereby resulting in low noise and/or power losses. It may also reduce the ripple current in the dc link capacitors which are usually connected in parallel with a power source, and thus reduce the requirements and the cost of such dc link capacitors.

As described above, the motor system may comprise a plurality of power converter groups and a plurality of connection bars. Each power converter group may be connected to a corresponding connection bar. In some embodiments, the modulation unit 1614 is employed to coordinate the switching actions in a group of power converters coupled to a connection bar. The coordination from the modulation unit 1614 helps to facilitate the control of the winding currents in the group. For example, in the system shown in FIG. 5, the sum of all N winding currents has to be zero. As such, it is possible to control only N−1 winding currents independently. In this case, a 2N-step modulation can be implemented in a way similar to the six-step modulation in a three-phase system, in which a complete line cycle is divided into 2N symmetrical periods, and each period has a dominant phase whose control signal has the highest absolute value. The switching of power switches in the dominant phase is disabled during the period, with its top switch (e.g., Q11) being kept on if the control signal is positive, and the bottom switch (e.g., Q12) being kept on if the control signal is negative.

Alternatively, one of the power converters in a group may be switched at a 50% duty cycle in an uncontrolled phase. The uncontrolled phase may be fixed, or alternating. For example, the dominant phase in the 2N-step modulation can be chosen as an uncontrolled phase, so the controlled phase changes 2N time during a line cycle.

Different modulation coordination methods may be used in different modes of the motor operation. If an impedance power converter is connected between the connection bar and the input power source as shown in FIG. 10 (e.g., impedance power converter 1001), the impedance power converter can be controlled in different ways. During normal operation, it may be disabled. As a result, the motor system works similarly as the embodiments discussed above. Alternatively, the impedance power converter can operate as an uncontrolled phase with its switches working at a 50% duty cycle. It should be noted that the current in L0 of FIG. 10 is relatively small. The current flowing through L0 may be caused by control transients and/or errors.

The block diagram in FIG. 16 is just an example highlighting some logic steps of the DCIM control system. A person skilled in the art would understand the control system can be implemented with different ways in hardware, software or in combination thereof. Depending on different design needs and applications, some of the blocks of the control system may be modified, split, mixed or combined to implement necessary control functions. Furthermore, the control system is configured to detect a plurality of operating parameters of the motor and determine the number of poles of the motor based upon the plurality of operating parameters to optimize a performance parameter of a system comprising the motor and the plurality of power converters.

Figure 17:
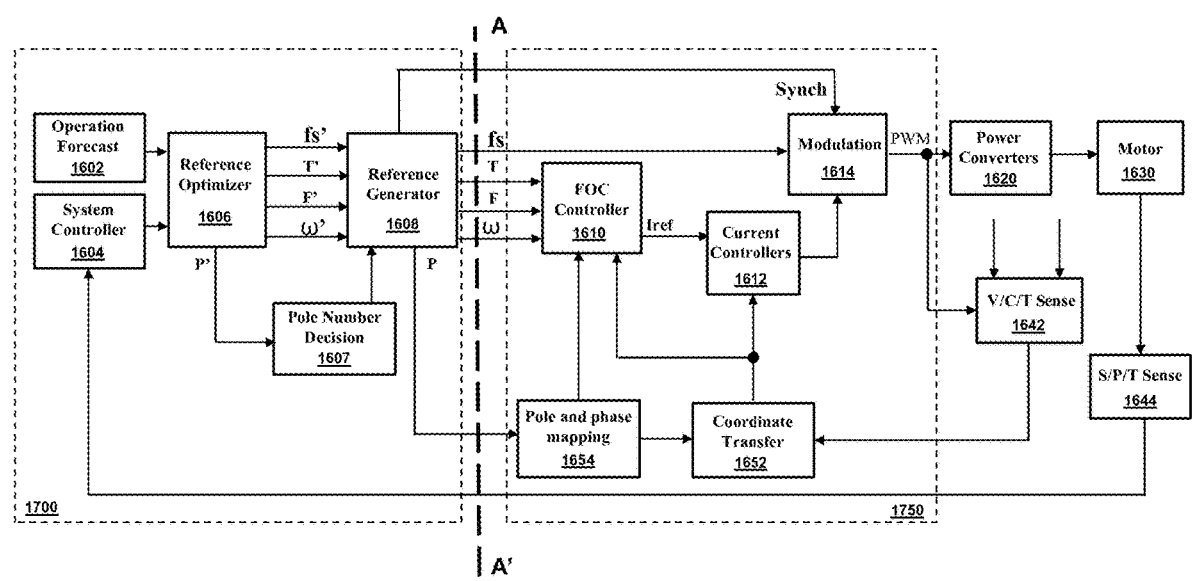
FIG. 17 illustrates a block diagram of a second implementation of a control system of the reconfigurable motor system in accordance with various embodiments of the present disclosure.

FIG. 17 illustrates a block diagram of a second implementation of a control system of the reconfigurable motor system in accordance with various embodiments of the present disclosure. The control system shown in FIG. 17 is similar to that shown in FIG. 16 except that the control system is divided into two controllers and an isolation boundary is placed between these two controllers.

Referring back to FIG. 5, the motor windings and power converters are divided into several groups. Some power converters and the main control system may be referenced to different ground (common) points. To save implementation cost, some of the control functions illustrated in FIG. 16 may be performed at a power converter group level in a group controller to avoid the need of electrical isolation for various sense signals, gate drive signal and control signals. Generally, functions directly related to the current and voltage sensing and the gate drive signals should be placed in the group controller. On the other hand, other functions should be placed in a drive controller.

FIG. 17 shows the control system includes a drive controller 1700 and a group controller 1750. An isolation boundary is placed between the drive controller 1700 and the group controller 1750. As shown in FIG. 17, the isolation boundary is placed along the line A-A'.

It should be noted, depending on different design needs, at least a portion of the FOC controller 1610 may be located in the drive controller 1700. Furthermore, the modulation unit 1614 may be placed in one or some of the power converters 1620.

It should further be noted that the majority of the signals crossing the isolation boundary are slow-changing signals. As such, some of the signals can be communicated through a serial communication to reduce the implementation cost. For example, in normal operation, the signals T, F, ω, and P shown in FIG. 17 are slow-changing variables. Such slow-changing signals can be sent to the group controller 1750 through one or more serial communication buses.

In some embodiments, in consideration with the faster reference changes during a pole-change transition, part or all functions in the reference generator 1608 may be placed in group controller 1750. Please also note that the unit for generating of the Synch signal may be placed in the drive controller 1700 or the group controller 1750 depending on different applications.

Figure 18:
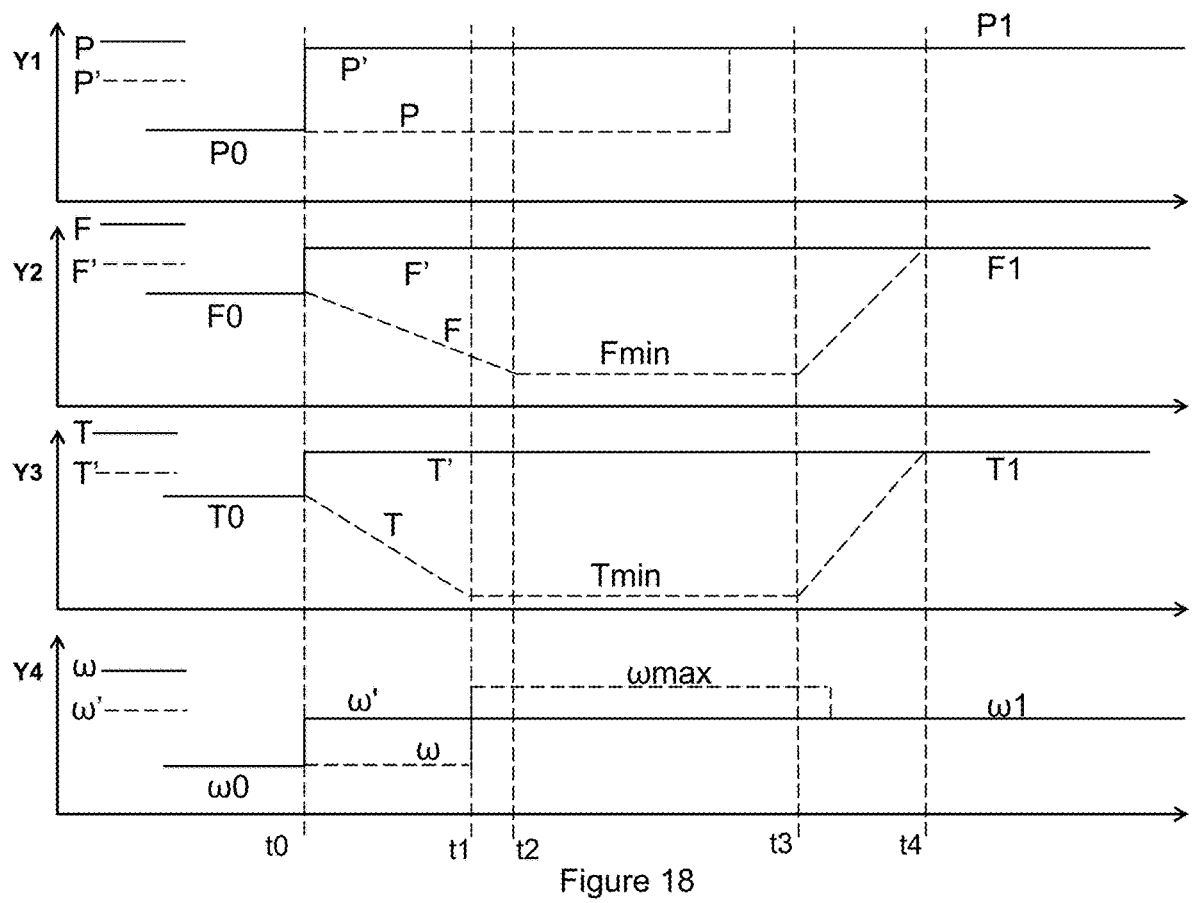
FIG. 18 illustrates various reference signal waveforms of the control system during a pole number change transition in accordance with various embodiments of the present disclosure.

FIG. 18 illustrates various reference signal waveforms of the control system during a pole number change transition in accordance with various embodiments of the present disclosure. The horizontal axis of FIG. 18 represents intervals of time. Four vertical axes are shown in the FIG. 18. The first vertical axis Y1 represents the number of pole pairs (P) in a dashed line and (P') in a solid line. The second vertical axis Y2 represents the flux strength (F) in a dashed line and (F') in a solid line. The third vertical axis Y3 represents the torque of the motor system (T) in a dashed line and (T') in a solid line. The fourth vertical axis Y4 represents the current frequency (ω) in a dashed line and (ω') in a solid line.

The DRIM system is designed to be able to decrease or increase the flux strength and torque output quickly. In other words, the DRIM system has a small electromagnetic inertia. In a traditional drive system such as electrical vehicles (EVs), a high mechanical inertia exists. Thus, the drive system can tolerate torque disruption for a short time. In the DRIM system, a smooth pole-change transition can be implemented by first bringing the magnetic field strength to a very low level, which may be almost equal to zero, and then changing the number of poles in the motor under such a low operating stress condition (under which the magnetic field strength and the currents and voltages in the motor and power converters are at a very low level), and then bringing the operating stress back to the normal level to start normal operation. FIG. 18 illustrates the smooth pole-change transition in detail.

At t0, the control system receives the signals P', F', T' and ω' from the reference optimizer 1606 (shown in FIG. 16) which indicates a need of changing the number of poles of the motor. The pole-change transition starts at t0. At t0, P', F', T' and ω' are equal to P0, F0, T0 and ω0 respectively as shown in FIG. 18. After the pole-change transition finishes at t4, P', ω', T' and F' change from P0, ω0, T0 and F0 to P1, ω1, T1 and F1 respectively as shown in FIG. 18. In order to have a smooth transition, the flux strength is gradually brought down to a minimum value Fmin from t0 to t2. At the minimum value, the voltage and/or current stresses in the motor and the power converters are very low. The low voltage and/or current stresses help to reduce the impact from the pole changing, thereby achieving a smooth transition.

To avoid excessive winding currents during the low flux operation, it is desirable to reduce the torque T in synch with or with a slight advance the reduction of the flux strength F. As shown in FIG. 18, the torque T is reduced gradually from t0 to t1. The torque is gradually brought down to a minimum value Tmin as shown in FIG. 18.

Furthermore, when the magnetic strength is very low, in order to have accurate and reliable sensing results of the control signals, it is optional to increase the frequency signal ω, up to a maximum value ωmax. As shown in FIG. 18, the frequency signal ω may be increased to ω1 at t0 as shown in FIG. 18. Alternatively, the frequency signal ω may stay at its original value until t1. At t1, before the occurrence of changing the number of poles, the frequency signal ω may be increased to ωmax. At a time instance between t3 and t4, after the occurrence of changing the number of poles, the frequency signal ω may be changed to ω1 as shown in FIG. 18.

As shown in FIG. 18, after F reaches the minimum value at t1, it is kept at this value for a short period, during which the number of pole in the control system is actually changed to the required value of P1. Then at t3, the flux and the torque are gradually brought up to their required values F1 and T1, respectively.

In some embodiments, the process (from t0 to t4) may take some milliseconds. Some milliseconds are short enough to avoid system operation interruption. If needed, the switching frequency may also be changed to a better value during part or all of the transition to better control the winding currents and/or the motor flux.

The system controller may also be configured with suitable anti-saturation or error-clamp measures as it cannot control the drive system during a pole-change transition. Outside the pole-change transition process, the reference generator may pass the preliminary reference values without any modifications, and the system controller resumes the control of the drive system.

Figure 19:
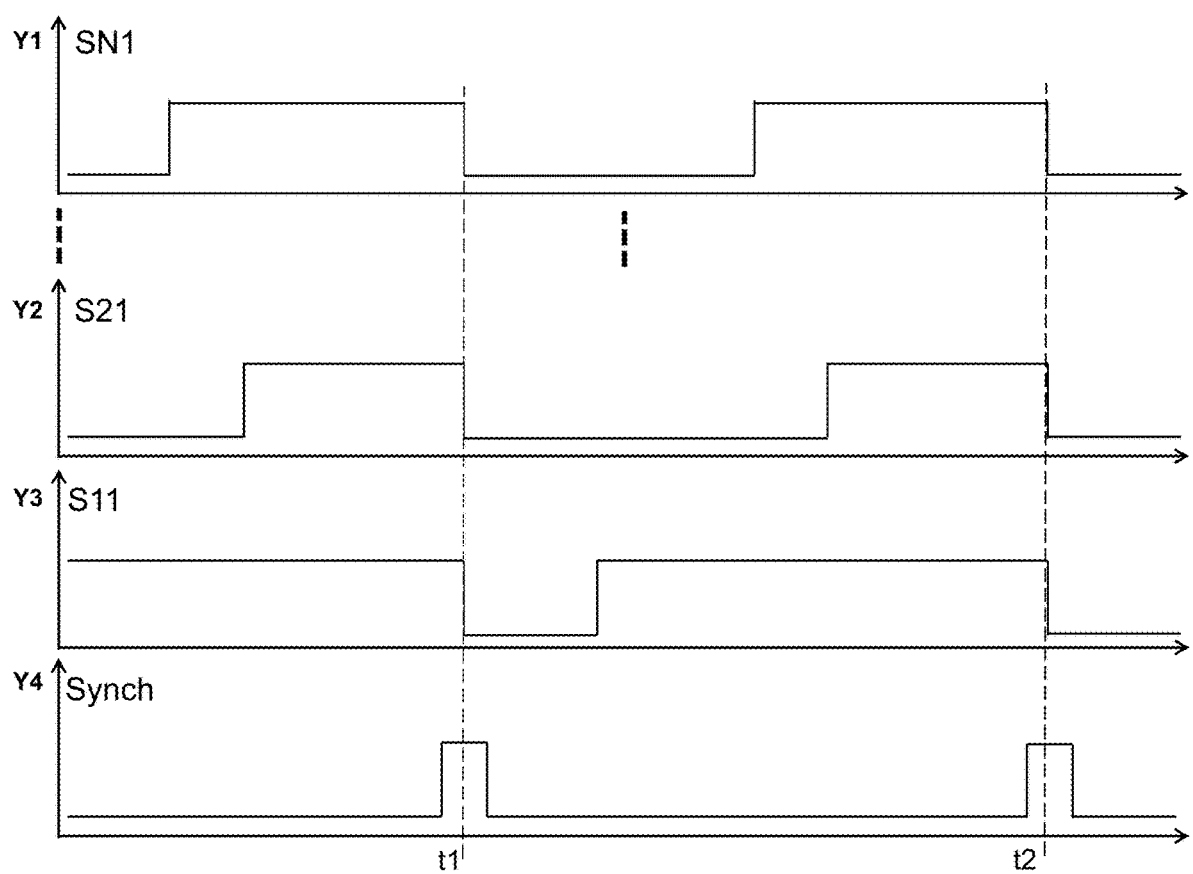
FIG. 19 illustrates various control signals of the control system in accordance with various embodiments of the present disclosure.

FIG. 19 illustrates various control signals of the control system in accordance with various embodiments of the present disclosure. The horizontal axis of FIG. 19 represents intervals of time. Four vertical axes are shown in FIG. 19. The first vertical axis Y1 represents the gate drive signal of a high-side switch of the nth power converter 50N shown in FIG. 5. The second vertical axis Y2 represents the gate drive signal of a high-side switch of the second power converter 502 shown in FIG. 5. The third vertical axis Y3 represents the gate drive signal of a high-side switch of the first power converter 501 shown in FIG. 5. The fourth vertical axis Y4 represents the sync signal of the motor system.

FIG. 19 shows the falling edges of the gate drive signals are vertically aligned with a center of the sync signal. This timing shown in FIG. 18 is merely an example, which should not unduly limit the scope of the claims. One of ordinary skill in the art would recognize many variations, alternatives, and modifications. For example, depending on different applications and design needs, the falling edges of the gate drive signals may be vertically aligned with a leading edge or a falling edge of the sync signal.

Furthermore, other configurations of the sync signal and the gate drive signals are also within the contemplated scope of the present disclosure. For example, the leading edges of the gate drive signals may be vertically aligned with the leading edge or the falling edge of the sync signal. Moreover, the leading edges of the gate drive signals may be vertically aligned with the center of the sync signal.

Figure 20:
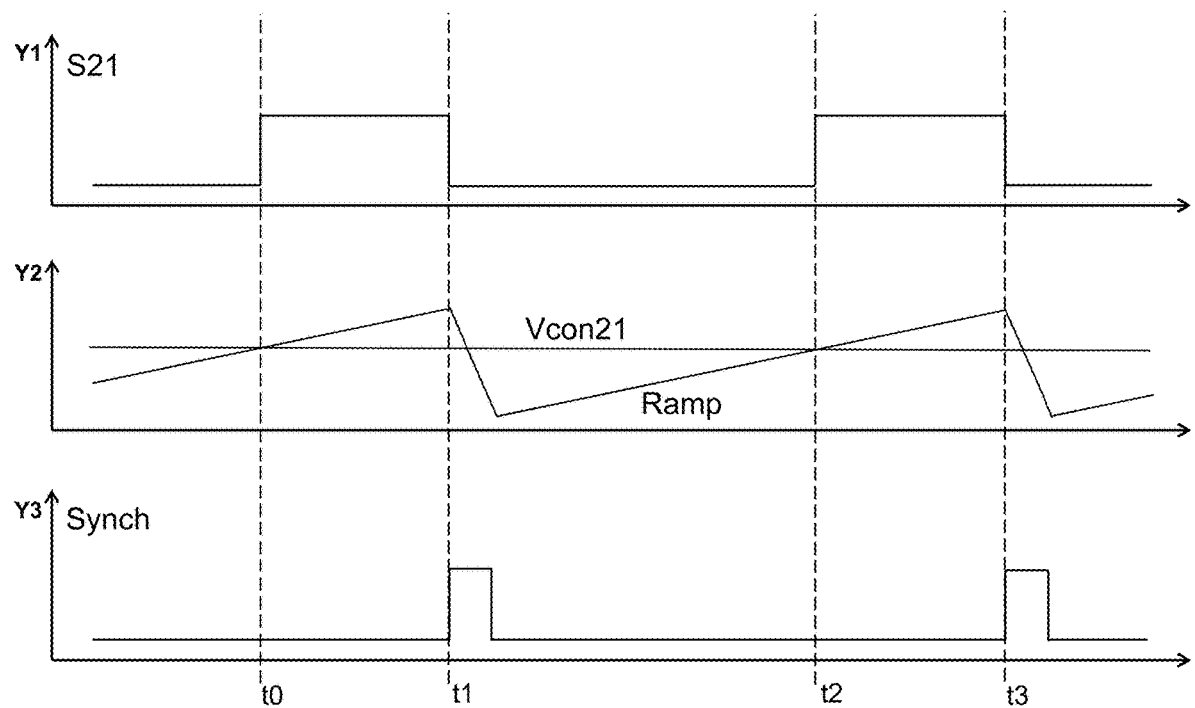
FIG. 20 illustrates various control signals of the control system in accordance with various embodiments of the present disclosure.

FIG. 20 illustrates various control signals of the control system in accordance with various embodiments of the present disclosure. The horizontal axis of FIG. 20 represents intervals of time. There may be three vertical axes. The first vertical axis Y1 represents the gate drive signal of the high-side switch of the second power converter 502 shown in FIG. 5. The second vertical axis Y2 represents the ramp and compensation output signals of the power converter. The third vertical axis Y3 represents the sync signal of the motor system.

FIG. 20 shows a way to use the common saw-tooth carrier to synchronize the gate drive signals. As shown in FIG. 20, the saw-tooth carrier is synched to the sync signal. Using the saw-tooth carrier to achieve synchronization is well known, and hence is not discussed herein.

Figure 21:
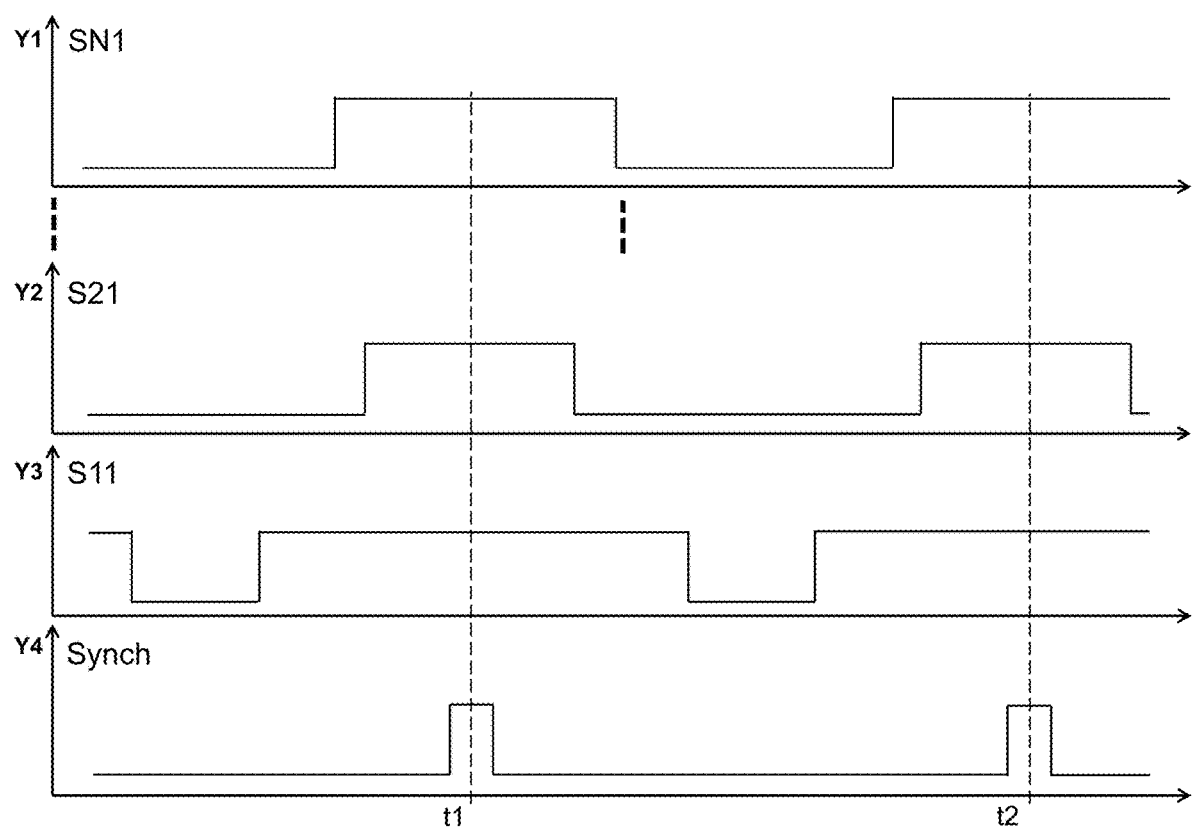
FIG. 21 illustrates various control signals of the control system in accordance with various embodiments of the present disclosure.

FIG. 21 illustrates various control signals of the control system in accordance with various embodiments of the present disclosure. The gate drive signals shown in FIG. 21 are similar to those shown in FIG. 19 except that the centers of the gate drive signals are synchronized to the center of the sync signal.

Figure 22:
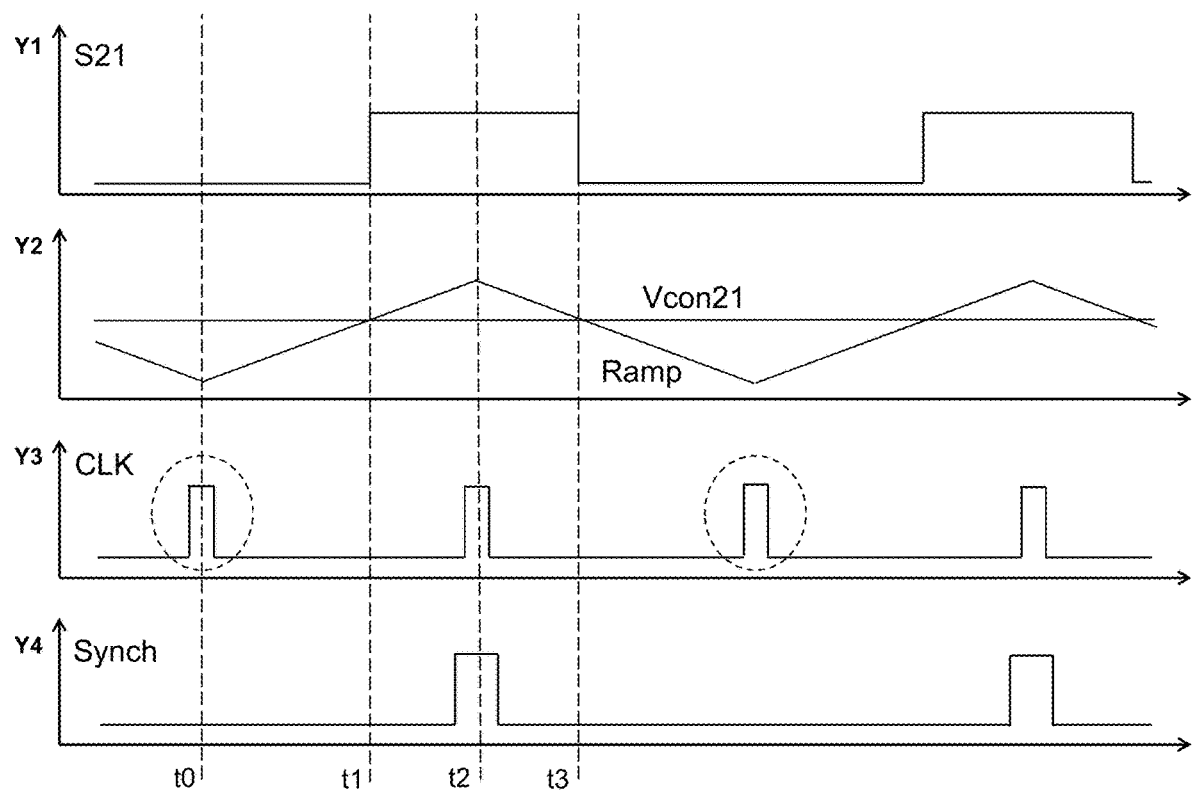
FIG. 22 illustrates various control signals of the control system in accordance with various embodiments of the present disclosure.

FIG. 22 illustrates various control signals of the control system in accordance with various embodiments of the present disclosure. The horizontal axis of FIG. 22 represents intervals of time. There may be four vertical axes. The first vertical axis Y1 represents the gate drive signal of the high-side switch of the second power converter 502 shown in FIG. 5. The second vertical axis Y2 represents the ramp and compensation output signals of the power converter. The third vertical axis Y3 represents a clock signal. The fourth vertical axis Y4 represents the sync signal of the motor system.

The clock signal CLK in FIG. 22 may be generated by a phase-locked loop (PLL) or other suitable circuits. The Synch signal may be generated based on the CLK signal through an encoder or a frequency divider. The sensing of the voltage and current signals can also be synchronized to the synch signal for better noise immunity and consistent results. Since the noise from switching actions is low at the center of a gate pulse, the synchronization methods shown in FIGS. 21 and 22 may help to reduce the impact from the noise from the switching actions. As shown in FIG. 22, either the sync signal or the clock signal CLK may be used as sense and sampling clocks. Also, in a system with multi groups of power converters, there may be multiple synch signals interleaved with each other, which can easily be generated from a common clock through a circuit such as an encoder or a frequency divider. In other words, the plurality of power converters is divided into a plurality of power converter groups. The gate drive signals of power switches in each power converter group may be synchronized to a clock signal. The clock signals of the plurality of power converter groups are interleaved. For example, in FIG. 22 the set of pulses within dotted circles in CLK signal may generate another synch signal similar to the Synch signal shown in FIG. 22 but with a phase shift. Each synch signal may be used for a group of power converters. The groups having Sync signals having the phase shift from each other may be connected to a connection bar, or the groups are coupled to the windings belonging to the same pole pair of the motor. In this way, the switching action of all the power converters may be spread out regularly to achieve a reduction in the noise level in the system. The dc link capacitor may also see less ripple current when multiple groups of power converters are coupled to a dc link through the interleaving action. Because most likely the modulators are implemented in software or firmware, it is possible to change the synchronization dynamically according to the dynamic reconfiguration of poles and/or phases when multiple synch signals are used.

A motor usually operates in a wide speed range. When the speed is low or during a startup process, the winding voltages and currents may have a very low frequency. It may be difficult or take a long time to sense such low-frequency waveforms. As each group of motor windings is arranged in a symmetrical manner, and the power converters are also controlled in a symmetrical fashion, it is possible to quickly obtain a current or voltage waveform through constructing a pseudo waveform based on the sensed values of similar signals from different windings in the group.

Figure 23:
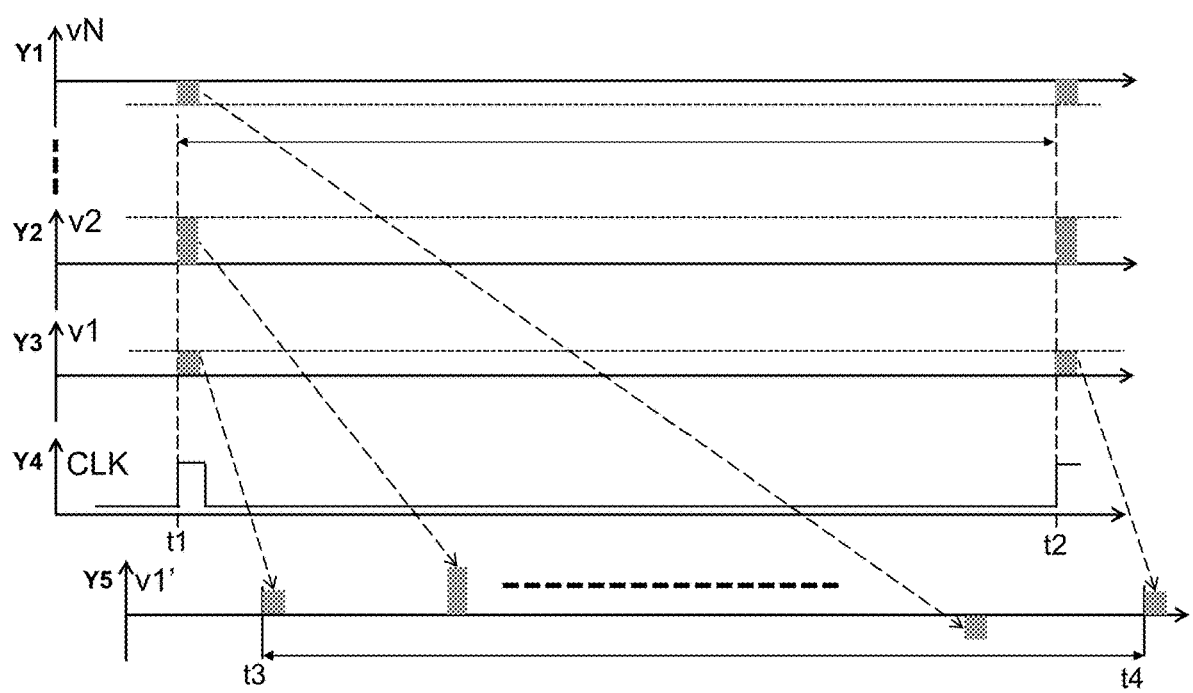
FIG. 23 shows an example of generating the pseudo waveform in accordance with various embodiments of the present disclosure.

FIG. 23 shows an example of generating the pseudo waveform in accordance with various embodiments of the present disclosure. In some embodiments, a group has N windings and N power converters. A variable v (e.g., winding voltage or current) is to be observed. This variable is designated as v1 in a first power converter or a first winding. This variable is designated as v2 in a second power converter or a second winding. This variable is designated as vN in an nth power converter or an nth winding.

In steady-state and symmetrical operation, signals v through vN should have the same waveform but with different phase angles. By measuring v1, v2, . . . , vN approximately at the same time, the values at different phase angles (which correspond to different time intervals) of the waveform of a variable can be estimated accordingly. As shown in FIG. 23, the pseudo waveform v1' can be constructed or predicted by utilizing the sensed signals from other power converters.

FIG. 23 illustrates various control signals of the control system in accordance with various embodiments of the present disclosure. The horizontal axis of FIG. 23 represents intervals of time. There may be five vertical axes. The first vertical axis Y1 represents the sampled signal of a variable in the nth power converter 50N or nth winding SN shown in FIG. 5. The second vertical axis Y2 represents the sampled signal of a variable in the second power converter 502 or second winding S2 shown in FIG. 5. The third vertical axis Y3 represents the sampled signal of a variable in the first power converter 501 or first winding S1 shown in FIG. 5. The fourth vertical axis Y4 represents the clock signal for sample and hold function of the motor system. The fifth vertical axis Y5 represents V1' (a pseudo waveform).

In FIG. 23, the time from t3 to t4 is defined as a line cycle, which is equal one over f, where f is the current frequency based on ω. By using the pseudo signal shown in FIG. 23, the performance of the system can be improved. This may be especially useful during low-speed operation or during the early stage of a start-up process.

Figure 24:
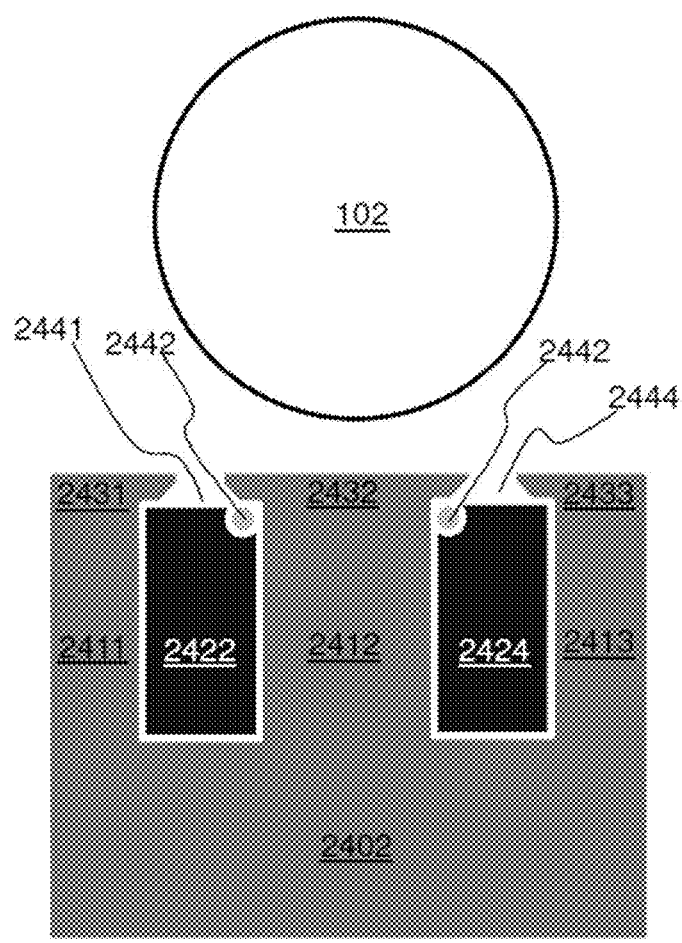
FIG. 24 illustrates a cross section view of a stator winding including a flux sensing apparatus in accordance with various embodiments of the present disclosure.

In DRIM systems, the power converters and the motor coupled to the power converters are usually mechanically integrated together. It is then possible to integrate some system components with the motor or the power converters. Furthermore, the system components may be placed in the power converters or between the motor and the power converters. FIG. 24 shows a way to integrate magnetic flux sensing windings with the windings of the motor. In some embodiments, the magnetic flux sensing windings function as flux linkage observers, which can be used as a sensing of the back EMF or flux linkage of the motor. In some embodiments, the magnetic sensing circuit can be used to estimate the speed of the rotor.

FIG. 24 illustrates a cross section view of a stator winding including a flux sensing apparatus in accordance with various embodiments of the present disclosure. The cross sectional view of FIG. 24 is taken along line A-A' shown in FIG. 1. The phase conductors 2422 and 2424 are located inside slots surrounded by magnetic teeth 2411, 2412, 2413 and a magnetic base 2402. The magnetic base 2402 provides mechanical support to the teeth 2411, 2412, 2413 and the conductors 2422, 2424.

The magnetic base 2402 and the teeth 2411-2413 may be manufactured as a single part. Alternatively, the magnetic base 2402 and the teeth 2411-2413 may be manufactured as separate parts. If the teeth 2411-2413 or the upper portions of the teeth 2411-2413 are manufactured as separate parts from the magnetic base 2402, the phase conductors may be attached to the magnetic base 2402 before the teeth 2411-2413 or the upper portions of the teeth 2411-2413 are assembled onto the rotor. Such an assembling process allows the phase conductors to be premanufactured as a single part through processes like casting, molding, soldering, welding and the like.

In some embodiments, a plurality of sense windings is employed to measure the operating parameters of the motor. As shown in FIG. 24, a sense winding 2442 is embedded in the slots where the phase conductors 2422, 2424 are located. As shown in FIG. 24, an upper-right portion of the phase conductor 2422 may be removed. The flux in the tooth 2412 can generate a voltage in the sense winding 2442, which is proportional to the back EMF in the conductors. As the flux linkage or the amplitude of flux in the airgap is proportional to the amplitude of the flux in a tooth, the voltage in the sense winding 2442 can be used to sense the flux linkage or the air gap flux.

The sense windings may be electrically isolated from the phase conductors (power windings). The sense windings may be placed around different parts of the slot. When a sense winding is placed adjacent to the tip of a tooth, the flux observed by the sense winding is approximately equal to the airgap flux linkage. When the sense winding is placed adjacent to the root of the tooth or around the yolk of the stator core, more leakage flux from the stator winding is included in the observed flux linkage, resulting in measurement results similar to the conventional stator flux linkage observer. In some embodiments, multiple flux observers are usually used to provide comprehensive sensing of the flux linkage in a motor. The controllability of how much stator leakage flux is included in the flux observer provides more freedom in the control design of the motor system.

Figure 25:
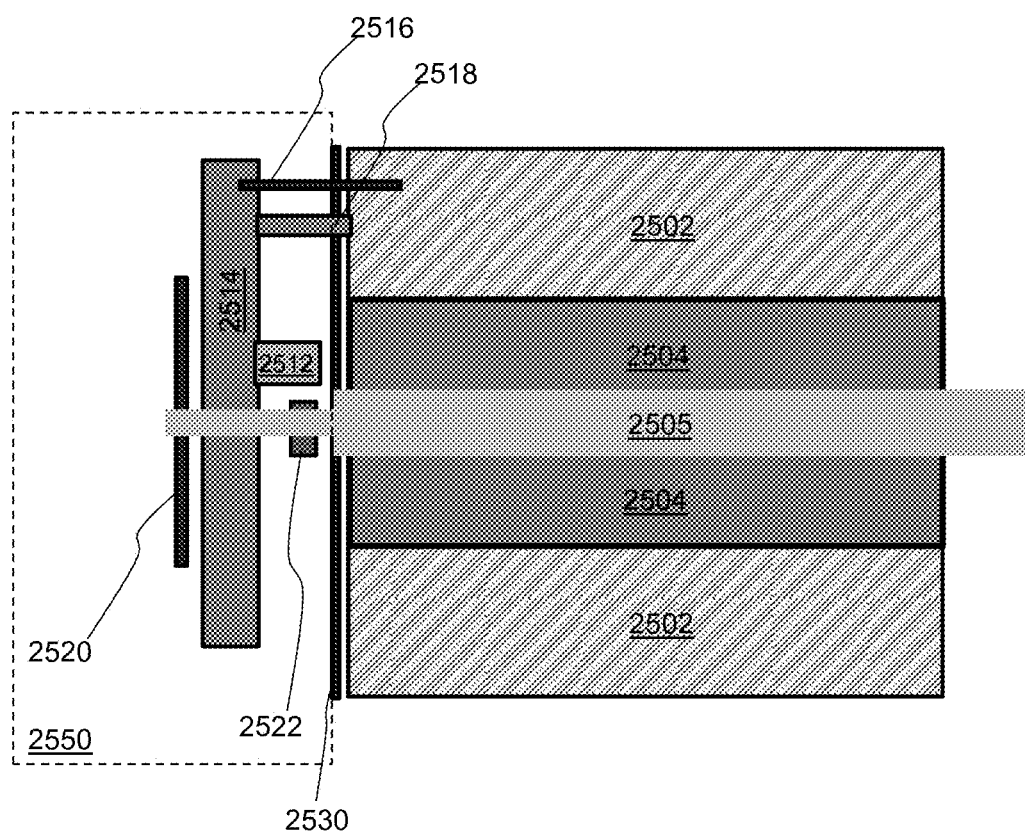
FIG. 25 illustrates a motor system including power converters and a cooling fan in accordance with various embodiments of the present disclosure.

FIG. 25 illustrates a motor system including power converters and a cooling fan in accordance with various embodiments of the present disclosure. The motor system comprises a rotor 2504, a stator 2502 and a shaft 2505. As shown in FIG. 25, the rotor 2504 is inside the stator 2502. The shaft 2505 is surrounded by the rotor 2504. The windings (not shown) are embedded in the stator 2502. A cooling fan 2520 is placed at one side of the motor inside the power converter housing 2550. A plurality of power converters 2514 is placed around the cooling fan 2520 as shown in FIG. 25.

A winding connection apparatus 2518 is connected between the stator 2502 and the plurality of power converters 2514. The winding connection apparatus 2518 is employed to provide a conductive path between the power converters and their respective windings. Furthermore, a mechanical connection apparatus 2516 is connected between the stator 2502 and the plurality of power converters 2514. In some embodiments, the mechanical connection apparatus 2516 is employed to provide mechanical support for the power converters 2514.

In operation, the motor may generate excessive heat. In order to protect the power converters 2514, an isolation board 2530 is placed between the motor and the power converters 2514. As shown in FIG. 25, the power converters 2514 and the motor are separated thermally and mechanically by the isolation board 2530. Furthermore, the cooling fan 2520 is mounted on the shaft 2505. The cooling fan 2520 helps to reduce the operating temperature to a level suitable for the power converters 2514.

As shown in FIG. 25, the mechanical connection apparatus 2516 between the motor and the power converters may extend through the isolation board 2530. Suitable counter vibration measures may be employed to reduce the impact from the vibration of the motor. In addition, the winding connection apparatus 2518 may extend through the isolation board 2530 as shown in FIG. 25. The winding connection apparatus 2518 may be coupled to the power converters 2514 through suitable connection devices such as a PCB, a connection wire or a connector.

FIG. 25 further shows a magnetic sensor 2512 and a magnetic block 2522 placed between the power converters 2514 and the motor. The magnetic sensor 2512 and the magnetic block 2522 collectively function as a position or speed sensor. The position and speed sensor can behave like a tachometer, a resolver or an encoder.

In some embodiments, the magnetic block 2522 is formed of a magnetic conductive material. Alternatively, the magnetic block 2522 may be formed by a permanent magnet. As shown in FIG. 25, the magnetic block 2522 is placed on or attached to the motor shaft 2505. As a result, the magnetic block 2522 rotates with the rotor 2504.

The magnetic sensor 2512 may be mounted on a board where the power converters 2514 are located. As shown in FIG. 25, the power converters 2514 are mechanically coupled to the stator 2502 of the motor through the mechanical connection apparatus 2516. As the rotor 2504 rotates, the magnetic block 2522 will come close to and be magnetically coupled to the magnetic sensor 2512 periodically. The periodical coupling may cause the operation of the circuits coupled to the magnetic sensor 2512 to change states. Such state changes can be detected, and a sensing pulse is generated accordingly.

It should be noted while FIG. 25 illustrates one magnetic sensor and one magnetic block, the motor system may include a plurality of magnetic sensors and magnetic blocks to fulfill various sensing functions.

In some embodiments, K1 magnetic blocks may be coupled to the motor shaft 2505, and K2 magnetic sensors are coupled to the power converters 2514. Each turn of the rotor can generate K1*K2 sensing pulses with a proper design. The positions of the magnetic blocks and sensors may be arranged such that the sensing pulses are evenly distributed in time when the rotor rotates at a constant speed. K1 and K2 may be different and the magnetic blocks and sensors may be shaped such that only one magnetic block enters the sensing range of any magnetic sensor at a time. Furthermore, suitable optical sensing methods may be used instead of magnetic sensing if desired.

Figure 26:
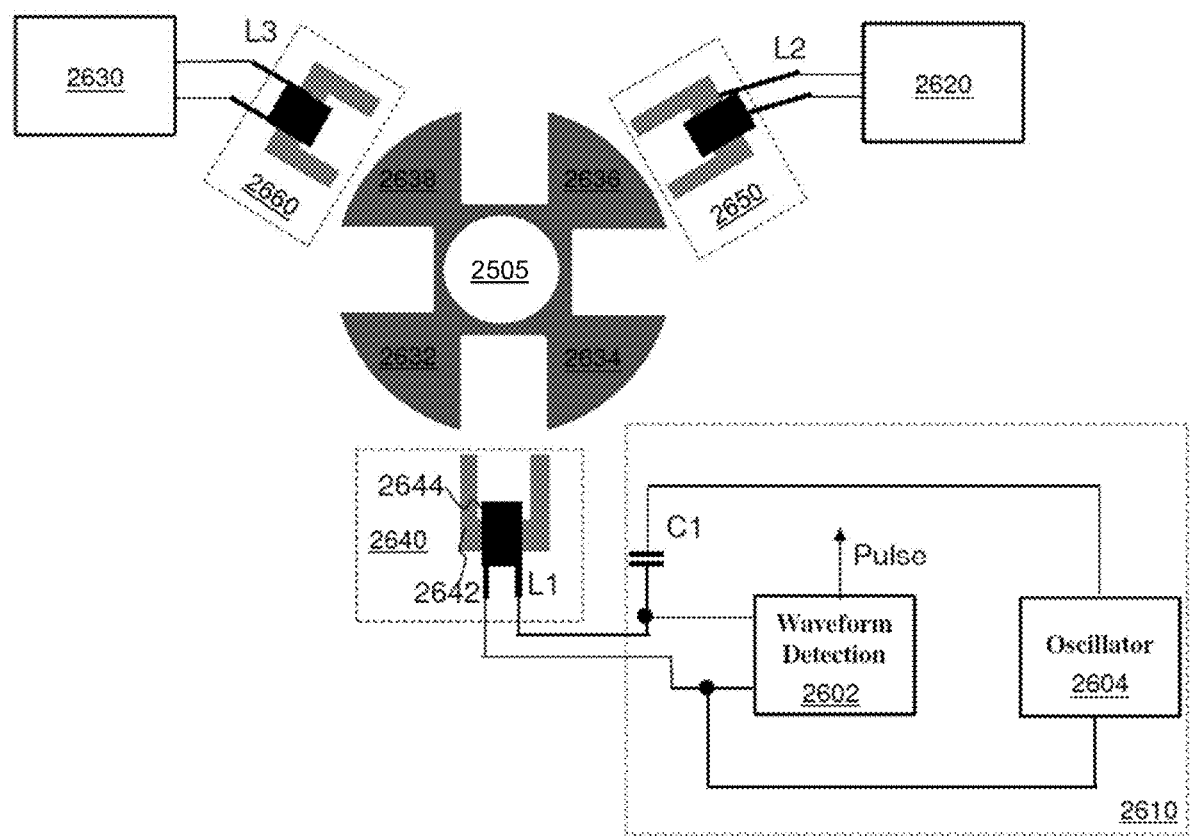
FIG. 26 illustrates a side view of an embodiment of magnetic blocks and magnetic sensors in accordance with various embodiments of the present disclosure.

FIG. 26 illustrates a side view of an embodiment of magnetic blocks and magnetic sensors in accordance with various embodiments of the present disclosure. There may be four magnetic blocks, namely a first magnetic block 2632, a second magnetic block 2634, a third magnetic block 2636 and a fourth magnetic block 2638. As shown in FIG. 26, each magnetic block may be made of silicon steel sheets. These four magnetic blocks may be evenly placed and mechanically coupled to the motor shaft.

FIG. 26 further illustrates three magnetic sensing circuits 2640, 2650 and 2660 evenly placed. Referring back to FIG. 25, the magnetic sensing circuits 2642, 2650 and 2660 are part of the magnetic sensor 2512. As such, the magnetic sensing circuits 2642, 2650 and 2660 may be mechanically coupled to a PCB board where the power converters are located.

The magnetic sensing circuit functions as a magnetic sensor. As shown in FIG. 26, each magnetic sensor (e.g., 2640) may be an inductor comprising a magnetic core 2642 and a sensing winding 2644. When a magnetic block rotates close to the sensing winding, the inductance of the sensing winding changes (the inductance increases in this case) significantly.

Each magnetic sensing circuit also comprises a processing circuit (e.g., 2610, 2620 and 2630). As shown in FIG. 26, the processing circuit 2610 comprises a waveform detection circuit 2602, an oscillator 2604 and a capacitor C1. The capacitor C1 and the sensing winding of the magnetic sensor can form a series or parallel resonance circuit having a resonant frequency equal or close to the oscillator frequency.

When a magnetic block comes close to the magnetic sensor, a resonance may be triggered on or off in the sensing circuit, so the voltage across the inductor or the capacitor changes rapidly. The waveform detection circuit 2602 can detect the voltage change and generate a pulse accordingly.

In order to sense the position or direction of the rotor, one or more magnetic blocks may be configured to produce a signature of the sense pulse different from the others or produce a series of different pulses at a time. As a result, the magnetic sensing circuits can distinguish the direction and/or position of the rotor during the rotor's rotation.

In the manufacturing process of the motor system, the magnetic blocks may be formed by cutting the same silicon steel sheets, which are used for manufacturing the rotor and stator lamination, thereby saving the material and manufacturing cost.

Figure 27:
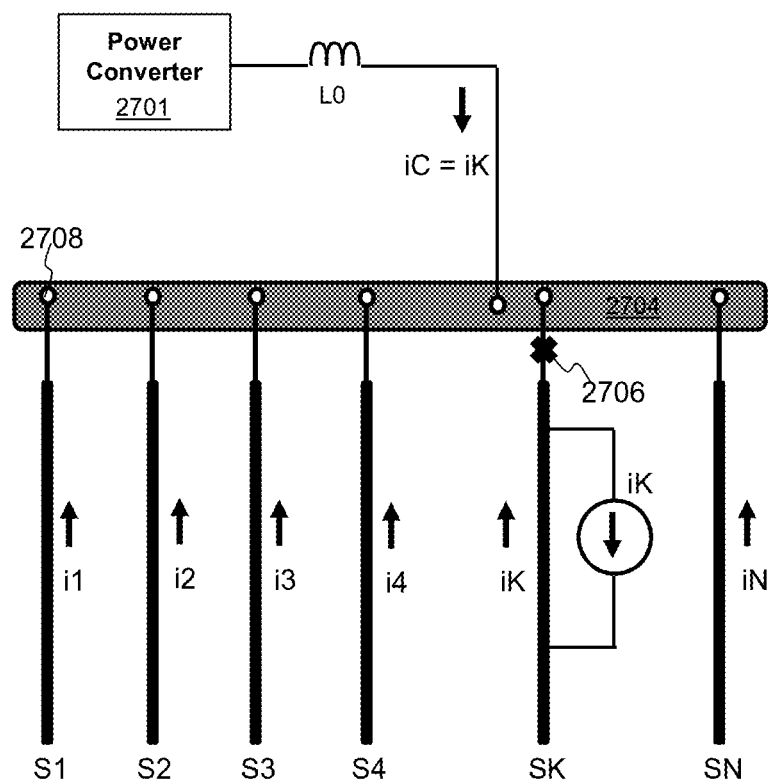
FIG. 27 illustrates a control scheme during a fault condition in accordance with various embodiments of the present disclosure.

Since the systems shown in FIGS. 5-15 have many windings and power converters, it is possible to design and control the systems such that they can continue to operate after a fault occurs in a system component. For example, the motor can maintain the operation after one or more power converters or windings fail. Since after a fault, the current in a winding is usually equal to zero, an open circuit may be used as an example to illustrate a typical failure condition as shown in FIG. 27 below.

In some embodiments, after a fault occurs in a winding of the motor or in a power converter coupled to a winding, the plurality of power converters is configured such that the motor maintains continuous operation. The control method for maintaining the continuous operation after a fault occurs is alternatively referred to as a fault tolerant control method. The control method for maintaining the continuous operation may include a plurality of different implementations.

In a first implementation, the plurality of windings is divided into a first set of windings and a second set of windings, and the first set of windings is evenly placed in even-numbered slots of the machine (e.g., the motor) and the second set windings is evenly placed in odd-numbered slots of the machine. The first set of power converters are connected to the first set of windings and the second set of power converters are connected to the second set of power converters. The machine operates in a reduced-phase mode by disabling a set of power converters after a power converter or a winding in the set fails.

In a second implementation, a controller of the motor system adjusts the current references of the plurality of power converters by adding a negative-sequence component to each winding current to maintain the continuous operation after the fault occurs.

In a third implementation, the power converters and the windings are arranged into a plurality of groups, and wherein within a group the windings are connected to a connection bar and the power converters are coupled to a power source. In addition, an impedance network is coupled between the power source and the connection bar. The impedance network is configured to conduct a current after the fault occurs. The impedance network is implemented as an impedance power converter and an inductor connected in series. In the third implementation, adjusting current references of the power converters in the group by adding a negative-sequence component and a zero-sequence component to current of each winding in the group after the fault occurs. Furthermore, the power converters are configured such that the impedance network conducts a current equal to the current would conduct in the failed phase if the failure had not occurred.

FIG. 27 illustrates a control scheme during a fault condition in accordance with various embodiments of the present disclosure. First ends of a plurality of windings S1-SN are connected to a connection bar 2704. Second ends of the plurality of windings are configured to be coupled to a plurality of power converters as shown in FIG. 10, but the converters are not shown here for the sake for brevity. The power converters are controlled to generate currents i1, i2 through iN in the windings.

FIG. 27 further illustrates an optional impedance network comprising an impedance power converter 2701 and an inductor L0. The impedance network is coupled to the connection bar 2704 through an inductor L0. Referring back to FIG. 10, the impedance power converter 2701 is similar to the impedance power converter 1001. The impedance network may be configured to provide a current during a fault condition, thereby achieving a current balance on the connection bar 2704 to make the sum of all currents flowing into the connection bar equal to zero.

In a fault condition, the motor may enter an unbalanced operation. As well known in the industry, in an unbalanced operation, the voltages, flux linkages and currents of the motor may have positive-sequence components, negative-sequence components and zero-sequence components. The average output power and torque of the motor are usually generated only by the positive-sequence components. The negative-sequence and zero-sequence components usually do not generate considerable average power or torque, but can contribute to the power and torque ripples, power losses and vibration and noise of the motor. Therefore, the negative-sequence and zero-sequence components should be controlled to minimize the degradation of the motor system operation. FIG. 27 illustrates a method of minimizing the impact from the negative-sequence and zero-sequence components in the fault condition.

Assume that an open fault occurs at Phase K due to a failure in the winding SK or a failure in the power converter coupled to the winding SK. The impedance power converter

2701 and the other power converters can be controlled to produce in the impedance network the same current as the faulty winding SK would conduct if there were no fault.

If the positive-sequence current reference for the faulted phase with a broken point or an open circuit (e.g., broken point 2706) at the winding SK is iK, the current iC produced by the impedance power converter 2701 may be set to iK as shown in FIG. 27. In this way, in terms of the current control, the fault has little impact on the current control of the rest windings connected to the connection bar 2704. On the other hand, an open circuit is equivalent to two identical currents canceling each other out. The open circuit failure in the winding SK can be modeled as an artificial current source with a value equal to iK, but in an opposite direction. As shown in FIG. 27, the artificial current source iK is connected in parallel with the winding SK.

The motor during fault operation now can be modelled as a paralleled two-motor system, a balance (symmetrical) multi-phase motor same as discussed previously for normal operation and a single phase motor. The single-phase motor has a single winding same as SK and conducts a current equal to −iK. The effect of this single-phase motor on the magnetic field and torque output of the motor can be analyzed and considered in the design of the motor and the control system.

If the multiple phases have the open failure shown in FIG. 27, the power converter 2701 can be controlled with a current reference equal to the sum of positive-sequence current references for all the faulted phases in the group, and treat the motor as a combination of a balanced multi-phase motor plus a motor with multi-phase windings located at the faulted phases conducting opposite currents. If there are multiple connection bars and winding groups, other non-faulty groups may be controlled as if there were symmetrical failures by making the corresponding winding current(s) equal to zero.

A negative-sequence current reference may be added to the windings in the same pole pair, the same group, or in the whole motor during fault operation with a phase failure (either a winding or a power converter failure) if there is no power converter coupling the connection bar to the input power source (i.e. power converter 2701 does not exist in FIG. 27). The negative-sequence current references should be arranged such that its amplitude is the same as that of the positive-sequence current reference, and has a 180° phase shift from the positive-sequence current reference for the faulted phase, thereby making the total current reference equal to zero for the faulted phase (phase K in FIG. 27). That is to make the negative-sequence component of the current reference in phase K cancels its positive-sequence component.

As discussed earlier, the average torque produced by the negative-sequence currents is approximately zero. As a result, the power and torque of the motor can still be controlled by the positive-sequence references. The negative-sequence currents in the stator windings may produce a negative-sequence flux in the motor's airgap. Because the slip rate at the negative sequence is very high (close to 2), the negative-sequence flux in the airgap cannot produce a significant torque. If a group has an impedance network to couple its connection bar (or connection point) to a power source, a zero-sequence current reference may be added in a manner similar to the negative sequence current references to the winding current references in this group. The combined negative-sequence and zero-sequence current reference should have the same amplitude as but a 180° phase shift from the positive-sequence reference at the faulty phase to make the three components cancel each other out, which is equivalent to an open circuit.

By adjusting the ratio of the zero-sequence and the negative-sequence current references, it is possible to reduce the difference of the current stress among different phases. In this way, the motor behaves like a balanced (symmetrical) multi-phase motor but with some negative-sequence and/or zero-sequence field excitation and phase currents. Such an operation is no longer symmetrical among the phases. Sometimes, it may be also desirable to limit the modification of current references to the phases in the pole pair where the faulty phase is located, or the group where the faulty phase is in to avoid the complexity of changing many current references.

To avoid overheating the power converters/the motor and saturation in the magnetic materials of the motor due to negative-sequence and zero-sequence currents and flux linkages in a faulty condition, the power rating of the system may need to be de-rated, and the limits of the currents and magnetic field strength may be lowered in comparison with the normal operation. Since the impact of a failure on the system performance is different in different pole and phase configurations, the control system may steer the system into the operation modes with the right number of poles and the right number of phases with less performance degradation. Alternatively, if the power and/or torque of the motor, and the power converters can be reduced, some power converters may be disabled to create a balanced system with less number of phases even if a fault exists. The number of poles may also be adjusted due to the occurrence of a failure to enable the formation of such a reduced-phase operation. For example, if a motor has 24 stator windings numbered in numbers from 1 to 12 and there is a failure in an even-numbered phase (winding or power converter), all the power converters coupled to the even-numbered windings can be disabled, and the remaining odd-numbered windings and the power converters coupled to them can still be configured as a balanced system. Such a balanced system is fully controlled and operable. However, because half of the windings and power converters are no longer active, the power rating of the system may be reduced, and the range of reconfigurable pole numbers and phase numbers may also be reduced. The original 12-winding system may be reconfigured to work in 2-pole 12-phase, 4-pole 6-phase and 8-pole 3-phase conditions under the constraint of symmetrical configuration, but now the 6-winding system after the fault may only be able to be reconfigured to operate in 2-pole 6-phase or 4-pole 3-phase configurations under the symmetrical constraint.

In the discussion above, it is assumed that the rotor is able to follow the dynamic reconfiguration in the stator automatically. This is true if the rotor has a squirrel winding structure as shown in induction motors described above. However, other machine types are also suitable to use the DRIM principle. One example is switched reluctance machines. The rotor of a switched reluctance machine comprises salient poles without any power windings. In the switched reluctance machines, the stator has more salient magnetic features. The winding currents of the switched reluctance machine can be controlled to change the number of poles dynamically in operation to optimize the system performance over a wide range. Another example is memory-effect permanent magnet machines, where the number of poles may also be changed with the magnets, so the number of poles in the windings can be dynamically reconfigured accordingly.

The discussion above uses one set of the stator windings as examples. The same principle is also applicable to motors and generators with more than one set of stator windings, such as certain double-fed motors and generators. Also, the same principles can be applied to rotor windings if needed.

Although the discussion above is generally based on motors, the techniques can be applied to generators or motors working in generating (regenerative) mode.

The discussion in this disclosure refers to motors and generators. The technology can be extended to actuators such as magnetic gears and other applications. Both radial airgap and axial airgap designs can use the disclosed techniques.

The discussion above is generally based on machines with cores and slots. However, the winding techniques and the control techniques, including the various embodiments of connection bars, can be applied to machines without cores (air-core machines) and/or without slots (slot-less machines). In a slot-less machine, the conductors or conductor assemblies are evenly distributed along a perimeter in a machine as if there were evenly distributed slots, so the winding arrangements discussed in the present disclosure can still be used.

Although the discussion above has been generally focused on the context of dynamically reconfigurable machines, many of the techniques, including but not limited to the modulation, current control, flux and speed/position sensing and cooling techniques disclosed in this disclosure are applicable also to machines with a fixed number of poles and/or fixed number of phases in a pair of poles.

Although embodiments of the present disclosure and its advantages have been described in detail, it should be understood that various changes, substitutions and alterations can be made herein without departing from the spirit and scope of the disclosure as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A method comprising:
providing a motor comprising a plurality of windings, a rotor and a stator magnetically coupled to the rotor;
coupling a plurality of power converters to the plurality of windings;
reducing a flux strength and a torque of the motor gradually;
after the step of reducing the flux strength and the torque of the motor, controlling the plurality of power converters to dynamically adjust the number of poles of the motor; and
after the step of controlling the plurality of power converters to dynamically adjust the number of poles of the motor, increasing the flux strength and the torque of the motor gradually.

2. The method of claim 1, wherein:
the plurality of power converters is controlled by a plurality of modulators, and wherein at least one power converter is configured to operate at a duty cycle approximately equal to 50%.

3. The method of claim 2, wherein:
the plurality of power converters is divided into a plurality of power converter groups, and wherein gate drive signals of power switches in each power converter group are synchronized to a clock signal, and clock signals of the plurality of power converter groups are interleaved.

4. The method of claim 1, further comprising:
adjusting the number of phases of the motor dynamically.

5. The method of claim 1, further comprising:
controlling a power converter to produce a magnetizing current with a harmonic component.

6. The method of claim 1, further comprising:
controlling the plurality of power converters to adjust currents flowing through the plurality of windings so as to dynamically adjust the number of poles of the motor.

7. The method of claim 6, further comprising:
adjusting a phase relationship of currents flowing through the plurality of windings to dynamically adjust the number of poles of the motor.

8. The method of claim 1, further comprising:
a plurality of power sources connected to the plurality of power converters, wherein the plurality of power converters is configured such that a charge balance is achieved among the plurality of power sources.

9. The method of claim 1, further comprising:
detecting a plurality of operating parameters of the motor; and
determining the number of poles of the motor based upon the plurality of operating parameters to optimize a performance parameter of a system comprising the motor and the plurality of power converters.

10. A system comprising:
a motor having a plurality of windings, a rotor and a stator magnetically coupled to the rotor, wherein the plurality of windings is configured such that the number of poles of the motor can be dynamically adjustable by adjusting currents flowing through the plurality of windings;
a plurality of power converters connected to respective windings, wherein the plurality of power converters and the plurality of windings are arranged into a plurality of symmetric groups controlled by a plurality of modulators synchronized by a plurality of interleaved clocks, and wherein gate drive signals in each symmetric group are synchronized to a clock; and
a controller configured to decide a plurality of operating parameters of the motor to optimize a set of performance parameters of the system.

11. The system of claim 10, wherein the controller comprises:
a system controller configured to receive feedback signals of the system;
a pole number decision unit configured to determine a suitable pole number based upon a plurality of operating parameters;
a reference optimizer configured to determine a preliminary set of operating variables based upon the plurality of operating parameters to optimize a performance parameter; and
a reference generator configured to determine a final set of operating variables based upon the preliminary set of operating variables and adjust the final set of operating variables after a pole number decision change to initiate a smooth transition so as to implement a pole number change by reducing a stress level of the motor and the plurality of power converters.

12. The system of claim 11, wherein:
the operating variables comprise a complete or partial combination of a torque of the motor, a flux strength of the motor, a switching frequency and a current frequency of the motor.

13. The system of claim 11, further comprising:
a function unit configured to generate a pseudo waveform of a current or voltage in a winding based on information sensed on currents or voltages of different windings.

14. The system of claim 10, wherein:
a winding is in a slot of the stator; and
a flux sense winding is embedded in the slot.

15. The system of claim 14, further comprising:
a circuit integrated in the plurality of power converters and magnetically coupled to a magnetic device embedded in a shaft coupled to the rotor, wherein the circuit is configured to sense a mechanical speed of the rotor.

16. A method comprising:
detecting operating parameters of a motor system comprising a plurality of windings, a rotor, a stator magnetically coupled to the rotor and a plurality of power converters connected to the plurality of windings;
determining, by a controller, a suitable pole number and a preliminary set of operating variables based upon the operating parameters;
reducing operating stresses of the motor system gradually; and
after reducing the operating stresses, configuring the plurality of power converters so as to adjust the number of poles of the motor system according to the suitable pole number.

17. The method of claim 16, wherein the step of reducing operating stresses includes:
reducing ta flux strength of the motor system to a level approximately equal to zero; and
reducing a torque of the motor system to a level approximately equal to zero.

18. The method of claim 16, further comprising:
generating a magnetizing current with a harmonic component by controlling the plurality of power converters.

19. The method of claim 16, further comprising:
dividing the plurality of power converters into a plurality of groups controlled by a plurality of modulators synchronized by a plurality of interleaved clocks; and
synchronizing gate drive signals in each power converter group to a clock signal.

20. The method of claim 16, wherein:
the plurality of power converters are connected to a plurality of power sources connected in series, wherein the controller configures the plurality of power converters such that a charge balance is achieved among the plurality of power sources connected in series.

* * * * *